(12) United States Patent
Lu et al.

(10) Patent No.: US 12,322,785 B2
(45) Date of Patent: Jun. 3, 2025

(54) POROUS GRAPHENE PARTICULATE-PROTECTED ANODE ACTIVE MATERIALS FOR LITHIUM BATTERIES

(71) Applicant: Nanotek Instruments, Inc., Dayton, OH (US)

(72) Inventors: Sheng-Yi Lu, Taipei (TW); Wen Y. Chiu, Taipei (TW); Bor Z. Jang, Centerville, OH (US)

(73) Assignee: Honeycomb Battery Company, Dayton, OH (US)

( * ) Notice: Subject to any disclaimer, the term of this patent is extended or adjusted under 35 U.S.C. 154(b) by 0 days.

(21) Appl. No.: 16/163,955

(22) Filed: Oct. 18, 2018

(65) Prior Publication Data
US 2020/0127277 A1    Apr. 23, 2020

(51) Int. Cl.
*H01M 4/583*    (2010.01)
*H01M 4/02*    (2006.01)
(Continued)

(52) U.S. Cl.
CPC ......... *H01M 4/133* (2013.01); *H01M 4/0416* (2013.01); *H01M 4/366* (2013.01); *H01M 4/386* (2013.01); *H01M 4/387* (2013.01); *H01M 4/583* (2013.01); *H01M 4/625* (2013.01); *H01M 10/0525* (2013.01); *H01M 2004/027* (2013.01)

(58) Field of Classification Search
CPC . H01M 4/13–134; H01M 4/137–1395; H01M 4/36; H01M 4/40–405; H01M 4/583–60; H01M 4/624–625; H01M 10/052–0525
See application file for complete search history.

(56) References Cited

U.S. PATENT DOCUMENTS 2,798,878 A    7/1957   Hummers
6,733,922 B2 *  5/2004   Matsubara .............. H01M 4/40
                                                        428/408
(Continued)

FOREIGN PATENT DOCUMENTS

WO    2018095285 A1    5/2018

OTHER PUBLICATIONS

PCT/US19/56031 International Search Report and Written Opinion dated Feb. 4, 2020, 15 pages.
(Continued)

*Primary Examiner* — Jonathan Crepeau
*Assistant Examiner* — Jacob Buchanan

(57) ABSTRACT

An anode for a lithium battery, comprising multiple porous graphene particulates, wherein at least one of the particulates comprises multiple pores (total volume Vpp), pore walls, and primary particles of an anode active material (total volume Va), disposed in the pores, wherein (a) the pore walls contain a graphene material; (b) the primary particles are in an amount from 0.5% to 95% by weight based on the total particulate weight; (c) the particulate is embraced or encapsulated by a thin encapsulating layer of electrically conducting material having a thickness from 1 nm to 10 μm, an electric conductivity from $10^{-6}$ S/cm to 20,000 S/cm and a lithium ion conductivity from $10^{-8}$ S/cm to $5 \times 10^{-2}$ S/cm; and (d) the volume ratio Vpp/Va is from 1.3/1.0 to 5.0/1.0.

21 Claims, 6 Drawing Sheets

(51) Int. Cl.
*H01M 4/04* (2006.01)
*H01M 4/133* (2010.01)
*H01M 4/36* (2006.01)
*H01M 4/38* (2006.01)
*H01M 4/62* (2006.01)
*H01M 10/0525* (2010.01)

(56) References Cited

U.S. PATENT DOCUMENTS

| | | | |
|---|---|---|---|
| 7,071,258 B1 | 7/2006 | Jang et al. | |
| 7,618,678 B2 | 11/2009 | Mao et al. | |
| 2005/0136330 A1 | 6/2005 | Mao et al. | |
| 2005/0271574 A1 | 12/2005 | Jang et al. | |
| 2008/0048152 A1 | 2/2008 | Jang et al. | |
| 2013/0136995 A1 | 5/2013 | Cho | |
| 2015/0099187 A1* | 4/2015 | Cui | H01M 10/052 429/231.8 |
| 2016/0043384 A1 | 2/2016 | Zhamu et al. | |
| 2017/0194105 A1 | 7/2017 | Zhamu et al. | |
| 2017/0194638 A1* | 7/2017 | Cho | H01M 10/0525 |
| 2017/0288211 A1 | 10/2017 | Zhamu et al. | |
| 2018/0006299 A1* | 1/2018 | Daigle | H01M 4/622 |
| 2018/0233736 A1 | 8/2018 | Zhamu et al. | |
| 2018/0241032 A1 | 8/2018 | Pan et al. | |
| 2018/0248173 A1 | 8/2018 | Pan et al. | |
| 2018/0261847 A1 | 9/2018 | Su et al. | |
| 2018/0287142 A1 | 10/2018 | Zhamu et al. | |
| 2018/0294476 A1 | 10/2018 | Zhamu et al. | |

OTHER PUBLICATIONS

Karlicky et al., "Halogenated Graphenes: Rapidly Growing Family of Graphene Derivatives" ACS Nano (2013) vol. 7, No. 8, pp. 6434-6464.

Liu et al., "Solutions for the problems of silicon-carbon anode materials for lithium-ion batteries" Royal Society Open Science (2018) vol. 5, p. 172370.

* cited by examiner

POROUS GRAPHENE PARTICULATE-PROTECTED ANODE ACTIVE MATERIALS FOR LITHIUM BATTERIES

FIELD OF THE INVENTION

The present invention relates generally to the field of rechargeable lithium battery and, more particularly, to the lithium battery anode containing a new group of porous graphene particulate-protected anode active material particles and the process for producing same.

BACKGROUND OF THE INVENTION

A unit cell or building block of a lithium-ion battery is typically composed of an anode active material layer, an anode or negative electrode layer (containing an anode active material responsible for storing lithium therein, a conductive additive, and a resin binder), an electrolyte and porous separator, a cathode or positive electrode layer (containing a cathode active material responsible for storing lithium therein, a conductive additive, and a resin binder), and a separate cathode current collector. The electrolyte is in ionic contact with both the anode active material and the cathode active material. A porous separator is not required if the electrolyte is a solid-state electrolyte.

The binder in the binder layer is used to bond the anode active material (e.g. graphite or Si particles) and a conductive filler (e.g. carbon black or carbon nanotube) together to form an anode layer of structural integrity, and to bond the anode layer to a separate anode current collector, which acts to collect electrons from the anode active material when the battery is discharged. In other words, in the negative electrode side of the battery, there are typically four different materials involved: an anode active material, a conductive additive, a resin binder (e.g. polyvinylidine fluoride, PVDF, or styrene-butadiene rubber, SBR), and an anode current collector (typically a sheet of Cu foil).

The most commonly used anode active materials for lithium-ion batteries are natural graphite and synthetic graphite (or artificial graphite) that can be intercalated with lithium and the resulting graphite intercalation compound (GIC) may be expressed as $Li_xC_6$, where x is typically less than 1. The maximum amount of lithium that can be reversibly intercalated into the interstices between graphene planes of a perfect graphite crystal corresponds to x=1, defining a theoretical specific capacity of 372 mAh/g.

Graphite or carbon anodes can have a long cycle life due to the presence of a protective solid-electrolyte interface layer (SEI), which results from the reaction between lithium and the electrolyte (or between lithium and the anode surface/edge atoms or functional groups) during the first several charge-discharge cycles. The lithium in this reaction comes from some of the lithium ions originally intended for the charge transfer purpose. As the SEI is formed, the lithium ions become part of the inert SEI layer and become irreversible, i.e. these positive ions can no longer be shuttled back and forth between the anode and the cathode during charges/discharges. Therefore, it is desirable to use a minimum amount of lithium for the formation of an effective SEI layer. In addition to SEI formation, the irreversible capacity loss $Q_{ir}$ can also be attributed to graphite exfoliation caused by electrolyte/solvent co-intercalation and other side reactions.

In addition to carbon- or graphite-based anode materials, other inorganic materials that have been evaluated for potential anode applications include metal oxides, metal nitrides, metal sulfides, and the like, and a range of metals, metal alloys, and intermetallic compounds that can accommodate lithium atoms/ions or react with lithium. Among these materials, lithium alloys having a composition formula of $Li_aA$ (A is a metal or semiconductor element, such as Al and Si, and "a" satisfies 0<a≤5) are of great interest due to their high theoretical capacity, e.g., $Li_4Si$ (3,829 mAh/g), $Li_{4.4}Si$ (4,200 mAh/g), $Li_{4.4}Ge$ (1,623 mAh/g), $Li_{4.4}Sn$ (993 mAh/g), $Li_3Cd$ (715 mAh/g), $Li_3Sb$ (660 mAh/g), $Li_{4.4}Pb$ (569 mAh/g), LiZn (410 mAh/g), and $Li_3Bi$ (385 mAh/g). However, as schematically illustrated in FIG. 1, in an anode composed of these high-capacity materials, severe pulverization (fragmentation of the alloy particles) occurs during the charge and discharge cycles due to severe expansion and contraction of the anode active material particles induced by the insertion and extraction of the lithium ions in and out of these particles. The expansion and contraction, and the resulting pulverization, of active material particles, lead to loss of contacts between active material particles and conductive additives and loss of contacts between the anode active material and its current collector. This degradation phenomenon is illustrated in FIG. 1. These adverse effects result in a significantly shortened charge-discharge cycle life.

To overcome the problems associated with such mechanical degradation, three technical approaches have been proposed:

(1) reducing the size of the active material particle, presumably for the purpose of reducing the total strain energy that can be stored in a particle, which is a driving force for crack formation in the particle. However, a reduced particle size implies a higher surface area available for potentially reacting with the liquid electrolyte to form a higher amount of SEI. Such a reaction is undesirable since it is a source of irreversible capacity loss.

(2) depositing the electrode active material in a thin film form directly onto a current collector, such as a copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area (even though the capacity per unit mass can be large). Such a thin film must have a thickness less than 100 nm to be more resistant to cycling-induced cracking, further diminishing the total lithium storage capacity and the lithium storage capacity per unit electrode surface area. Such a thin-film battery has very limited scope of application. A desirable and typical electrode thickness is from 100 μm to 200 μm. These thin-film electrodes (with a thickness of <500 nm or even <100 nm) fall short of the required thickness by three (3) orders of magnitude, not just by a factor of 3.

(3) using a composite composed of small electrode active particles protected by (dispersed in or encapsulated by) a less active or non-active matrix, e.g., carbon-coated Si particles, sol gel graphite-protected Si, metal oxide-coated Si or Sn, and monomer-coated Sn nanoparticles. Presumably, the protective matrix provides a cushioning effect for particle expansion or shrinkage, and prevents the electrolyte from contacting and reacting with the electrode active material. Examples of anode active particles are Si, Sn, and $SnO_2$. Unfortunately, when an active material particle, such as Si particle, expands (e.g. up to a volume expansion >300%) during the battery charge step, the protective coating is easily broken due to the mechanical weakness and/o brittleness of the protective coating materials. There has been no high-strength and high-toughness material available that is itself also lithium ion conductive.

It may be further noted that the coating or matrix materials used to protect active particles (such as Si and Sn) are carbon, sol gel graphite, metal oxide, monomer, ceramic, and lithium oxide. These protective materials are all very brittle, weak (of low strength), and/or non-conducting (e.g., ceramic or oxide coating). Ideally, the protective material should meet the following requirements: (a) The coating or matrix material should be of high strength and stiffness so that it can help to refrain the electrode active material particles, when lithiated, from expanding to an excessive extent. (b) The protective material should also have high fracture toughness or high resistance to crack formation to avoid disintegration during repeated cycling. (c) The protective material must be inert (inactive) with respect to the electrolyte, but be a good lithium ion conductor. (d) The protective material must not provide any significant amount of defect sites that irreversibly trap lithium ions. (e) The protective material must be lithium ion-conducting as well as electron-conducting. The prior art protective materials all fall short of these requirements. Hence, it was not surprising to observe that the resulting anode typically shows a reversible specific capacity much lower than expected. In many cases, the first-cycle efficiency is extremely low (mostly lower than 80% and some even lower than 60%). Furthermore, in most cases, the electrode was not capable of operating for a large number of cycles. Additionally, most of these electrodes are not high-rate capable, exhibiting unacceptably low capacity at a high discharge rate.

Due to these and other reasons, most of prior art composite electrodes have deficiencies in some ways, e.g., in most cases, less than satisfactory reversible capacity, poor cycling stability, high irreversible capacity, ineffectiveness in reducing the internal stress or strain during the lithium ion insertion and extraction steps, and other undesirable side effects.

Complex composite particles of particular interest are a mixture of separate Si and graphite particles dispersed in a carbon matrix; e.g. those prepared by Mao, et al. ["Carbon-coated Silicon Particle Powder as the Anode Material for Lithium Batteries and the Method of Making the Same," US 2005/0136330 (Jun. 23, 2005)]. Also of interest are carbon matrix-containing complex nano Si (protected by oxide) and graphite particles dispersed therein, and carbon-coated Si particles distributed on a surface of graphite particles Again, these complex composite particles led to a low specific capacity or for up to a small number of cycles only. It appears that carbon by itself is relatively weak and brittle and the presence of micron-sized graphite particles does not improve the mechanical integrity of carbon since graphite particles are themselves relatively weak. Graphite was used in these cases presumably for the purpose of improving the electrical conductivity of the anode material. Furthermore, polymeric carbon, amorphous carbon, or pregraphitic carbon may have too many lithium-trapping sites that irreversibly capture lithium during the first few cycles, resulting in excessive irreversibility.

In summary, the prior art has not demonstrated a composite material that has all or most of the properties desired for use as an anode material in a lithium-ion battery. Thus, there is an urgent and continuing need for a new anode for the lithium-ion battery that has a high cycle life, high reversible capacity, low irreversible capacity, and compatibility with commonly used electrolytes. There is also a need for a method of readily or easily producing such a material in large quantities.

Thus, it is an object of the present invention to provide a porous graphene particulate-protected anode active material. These particulates contain anode active material particles residing in the pores of these particulates. Another object of the present invention is to provide a cost-effective process for producing highly conductive, mechanically robust porous graphene particulates in large quantities.

SUMMARY OF THE INVENTION

Herein reported is a significantly improved anode layer that provides not only a robust 3-D network of electron-conducting pathways and high conductivity, but also enables the battery to exhibit a long-term cycling stability. Both the reversible capacity and the first-cycle efficiency are also significantly improved over those of state-of-the-art anode materials.

In some embodiments, the invention provides an anode or negative electrode for a lithium battery. The anode comprises multiple porous graphene-containing particulates (secondary particles), wherein at least one of the porous graphene particulates comprises multiple pores (having a total volume $V_{pp}$), pore walls (containing graphene or carbon bonded graphene sheets), and primary particles of an anode active material (having a total volume $V_a$, disposed in the pores), wherein a. the pore walls contain a graphene material selected from a pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof;

b. the primary particles of anode active material are in an amount from 0.5% to 95% by weight based on the total porous graphene particulate weight;

c. the graphene-containing particulate is embraced or encapsulated by a thin encapsulating layer of an electrically conducting material (e.g. carbon, graphene sheets, carbon-bonded graphene sheets, conducting polymer, etc.) having a thickness from 1 nm to 10 μm, an electric conductivity from $10^{-6}$ S/cm to 20,000 S/cm and a lithium ion conductivity from $10^{-8}$ S/cm to $5 \times 10^{-2}$ S/cm (this encapsulating shell layer can be naturally formed when the invented process is conducted); and d. the volume ratio $V_{pp}/V_a$ is from 1.3/1.0 to 5.0/1.0 and the pores in the particulate have a sufficient amount of free space to accommodate the volume expansion of the primary particles of anode active material when the lithium battery is charged without inducing a volume expansion of the anode electrode by more than 20% (preferably from 0% to 10%).

In some embodiments, the porous graphene particulate, excluding particles of anode active material, has a density from 0.1 to 1.5 $g/cm^3$ and a specific surface area from 50 to 2,000 $m^2/g$. There is no restriction on the shape of such a porous graphene particulate. The porous graphene particulate typically has a dimension (e.g. diameter, major axis, etc.) from 100 nm to 50 μm, preferably from 0.5 μm to 20 μm, and most preferably from 1 μm to 10 μm. The largest dimension of the particulate typically is less than 1 mm, more typically less than 100 μm, and most typically 50 μm.

The porous graphene particulate can assume practically any shape: spherical, ellipsoidal, potato-shaped, rod-shape, irregular shape, etc.

Briefly, the present invention provides a new anode electrode composition wherein primary particles of an anode active material (e.g. Si, Li, or $SnO_2$ particles) are naturally lodged in pores of a porous graphene particulate. These porous graphene particulates are in a powder form containing isolated, individual particulates that are not formed into a sheet of graphene foam; the latter graphene foam (in a large sheet form being typically 10-100 cm wide and 1-100 meters long) is described in one of our earlier applications (Aruna Zhamu and Bor Z. Jang, "Graphene Foam-Protected Anode Active Materials for Lithium Batteries," U.S. patent application Ser. No. 14/121,151 (Aug. 7, 2014) (U.S. Pat. Pub. No. 2016/0043384).

The particulate has an adequate room to accommodate the expanded volume of the anode active material particles when the battery is charged. The cell walls of the presently invented porous graphene particulate are elastic, of good structural integrity, highly electrically conducting and thermally conducting. When individual anode active material particles expand (upon Li intercalation), the volume expansion is accommodated by the surrounding pores without inducing a significant volume change of the graphene particulate and with a minimal volume expansion (0% to 20%, typically <10%) of the entire anode layer (hence, not exerting internal pressure to the battery). During the subsequent discharge cycle, these particles shrink; yet the local cell walls shrink or snap back in a congruent manner, maintaining a good contact between cell walls and the anode active particles (remaining capable of accepting $Li^+$ ions and electrons during the next charge cycle).

In some embodiments, the porous graphene particulate further comprises a carbon material that chemically bonds sheets of a graphene material together to form an integral 3D network of electron-conducting pathways interposed between pores inside the particulate.

Typically, the exterior surface of the porous graphene particulate is naturally sealed with a thin layer of graphene, carbon, or a graphene-carbon combination (e.g. graphene sheets bonded by a carbon material) when the particulates are made by using the presently invented process (described in a later portion of this section). The exterior surface may also be sealed with an electrically conducting material, such as an intrinsically conducting polymer, a conducting polymer composite (e.g. having graphene sheets, CNTs, expanded graphite flakes, etc. dispersed in or bonded by a polymer), or a conducting metal oxide (e.g. indium-tin oxide).

The pristine graphene material has essentially zero % of non-carbon elements (<0.02%). A non-pristine graphene material has from 0.02% to 20% by weight of non-carbon elements, wherein the non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

In certain embodiments, the anode active material is selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li; and (h) combinations thereof. The prelithiated version of a high-capacity anode active material means an anode active material that is intercalated or inserted with a desired amount of lithium before this anode active material is introduced into the foam pores, or before this anode active material is mixed with the graphene material to form a foamed structure. In a preferred embodiment, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, or a combination thereof, wherein x=1 to 2.

Preferably, the anode active material is in a form of nanoparticle, nanowire, nanofiber, nanotube, nanosheet, nanobelt, nanoribbon, or nanocoating having a thickness or diameter less than 100 nm. More preferably, the anode active material has a dimension less than 20 nm.

In some embodiments, the porous graphene particulate further comprises a carbon or graphitic material therein, wherein the carbon or graphite material is in electronic contact with or deposited onto the anode active material particle surface. Most preferably, this carbon or graphite material embraces the particles of the anode active material and the embraced particles are then lodged in the pores of the porous graphene particulate. The carbon or graphite material may be selected from polymeric carbon, amorphous carbon, chemical vapor deposition carbon (CVD carbon), coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof.

In certain embodiments, individual primary particles of the anode active material are coated with a conductive protective coating, selected from a carbon material, electronically conductive polymer, conductive metal oxide, conductive metal coating, or a lithium-conducting material.

Typically, in the invented porous graphene particulates, the pore walls contain stacked graphene planes having an inter-plane spacing $d_{002}$ from 0.3354 nm to 0.36 nm as measured by X-ray diffraction. The pore walls can contain a pristine graphene and the porous graphene particulate has a density from 0.1 to 1.5 g/cm$^3$ (when measured in the absence of the anode active material particles). In some embodiments, the non-pristine graphene material contains a content of non-carbon elements from 0.01% to 2.0% by weight. In one embodiment, the pore walls contain graphene fluoride and the porous graphene particulate contains a fluorine content from 0.01% to 2.0% by weight. In another embodiment, the pore walls contain graphene oxide and the porous graphene particulate contains an oxygen content from 0.01% to 2.0% by weight. Typically, the non-carbon elements include an element selected from oxygen, fluorine, chlorine, bromine, iodine, nitrogen, hydrogen, or boron. More typically, the porous graphene foam has a specific surface area from 200 to 2,000 m$^2$/g or a density from 0.3 to 1.3 g/cm$^3$.

In a preferred embodiment, the porous graphene particulate has an oxygen content or non-carbon content less than 0.01% by weight and the pore walls contain stacked graphene planes having an inter-graphene spacing less than 0.34 nm. Further preferably, the porous graphene particulate has an oxygen content or non-carbon content no greater than 0.01% by weight and the pore walls contain stacked graphene planes having an inter-graphene spacing less than 0.336 nm, and a mosaic spread value no greater than 0.7. Most preferably, the porous graphene particulate has pore walls containing stacked graphene planes having an inter-graphene spacing less than 0.336 nm, and a mosaic spread value no greater than 0.4.

The pore walls may contain stacked graphene planes having an inter-graphene spacing less than 0.337 nm and a mosaic spread value less than 1.0. In an embodiment, the porous graphene particulate exhibits a degree of graphitization no less than 80% and/or a mosaic spread value less than 0.4. More preferably, the porous graphene particulate exhibits a degree of graphitization no less than 90% and/or a mosaic spread value no greater than 0.4. Typically, in the invented anode layer, the pore walls contain a 3D network of interconnected graphene planes.

The present invention also provides a powder mass of an anode active material comprising multiple porous graphene particulates, wherein at least one of said porous graphene particulates comprises multiple pores, having a total volume Vpp, pore walls, and primary particles of said anode active material, having a total volume Va, disposed in the pores, wherein
  A) the pore walls contain a graphene material selected from a pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof;
  B) the primary particles of anode active material are in an amount from 0.5% to 95% by weight based on the total porous graphene particulate weight;
  C) the graphene particulate is embraced or encapsulated by a thin encapsulating layer of electrically conducting material having a thickness from 1 nm to 10 μm, an electric conductivity from $10^{-6}$ S/cm to 20,000 S/cm and a lithium ion conductivity from $10^{-8}$ S/cm to $5 \times 10^{-2}$ S/cm; and
  D) the volume ratio Vpp/Va is from 1.3/1.0 to 5.0/1.0.

The present invention also provides a lithium battery containing the anode or negative electrode as defined above, a cathode or positive electrode, and an electrolyte in ionic contact with the anode and the cathode. This lithium battery can further contain a cathode current collector in electronic contact with the cathode.

In an embodiment, the lithium battery further contains an anode current collector in electronic contact with the anode. Alternatively and more preferably, in the lithium battery, the graphene foam operates as an anode current collector to collect electrons from the anode active material during a charge of the lithium battery, which contains no separate or additional current collector. The lithium battery can be a lithium-ion battery, lithium metal battery, lithium-sulfur battery, or lithium-air battery.

The invention also provides a process for producing the multiple porous graphene particulates as a powder mass for the anode layer as described above. The process comprises:
  (a) preparing a graphene dispersion having multiple primary particles of an anode active material and multiple sheets of a graphene material dispersed in a liquid medium, wherein the graphene material is selected from a pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof and wherein the dispersion contains a blowing agent having a blowing agent-to-graphene material weight ratio from 0.01/1.0 to 1.0/1.0;
  (b) dispensing, forming and drying the graphene dispersion into multiple droplets containing therein graphene sheets, particles of the anode active material, and the blowing agent; and
  (c) heat treating the droplets at a heat treatment temperature selected from 80° C. to 3,200° C. (typically <2,500° C., more typically <2,100° C., and further more typically <1,500° C.) at a desired heating rate sufficient to induce volatile gas molecules from the non-carbon elements or to activate the blowing agent for producing the multiple porous graphene particulates.

The process may further include a step of combining these multiple porous graphene particulates, along with a resin binder and an optional conductive additive, into an anode electrode, preferably on an anode current collector (e.g. Cu foil).

In certain embodiments, the graphene material contains pristine graphene and the dispersion contains a blowing agent having a blowing agent-to-pristine graphene weight ratio from 0.01/1.0 to 1.0/1.0.

In certain embodiments, the blowing agent is a physical blowing agent, a chemical blowing agent, a mixture thereof, a dissolution-and-leaching agent, or a mechanically introduced blowing agent.

In certain embodiments, the step of dispensing, forming and drying includes operating a procedure selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, or a combination thereof.

In certain embodiments, the dispersion further comprises a polymer dissolved or dispersed in the liquid medium, wherein the polymer-to-graphene weight ratio is from 1/100 to 100/1.

In certain embodiments, the graphene material is selected from the group of non-pristine graphene materials consisting of graphene oxide, reduced graphene oxide, graphene fluoride, graphene chloride, graphene bromide, graphene iodide, hydrogenated graphene, nitrogenated graphene, chemically functionalized graphene, and combinations thereof, and wherein the heat treatment temperature is less than 2,500° C. and the porous graphene particulate contains a content of non-carbon elements from 0.01% to 2.0% by weight.

In certain embodiments, the first heat treatment temperature is selected from 100° C. to 1,500° C.

In certain embodiments, the process further comprises a step of coating or embracing the porous graphene particulates with a thin encapsulating layer of a polymer or a polymer composite containing a carbonaceous or graphitic material dispersed in or bonded by a polymer to form polymer- or polymer composite-encapsulated porous graphene particulates. The process may further comprise a step of heat-treating the polymer- or polymer composite-encapsulated porous graphene particulates to obtain carbon- or graphite-encapsulated porous graphene particulates.

The amount of blowing agent may be reduced if the graphene material has a content of non-carbon elements (e.g. O, H, N, B, F, Cl, Br, I, etc.) no less than 5% by weight (preferably no less than 10%, further preferably no less than 20%, even more preferably no less than 30% or 40%, and most preferably up to 55%). The subsequent high temperature treatment serves to remove a majority of these non-carbon elements from the graphene material, generating volatile gas species that produce pores or cells in the solid graphene material structure. In other words, quite surprisingly, these non-carbon elements play the role of a blowing agent. However, the use of a blowing agent can provide added flexibility in regulating or adjusting the porosity level and pore sizes for a desired application. The blowing agent is typically required if the non-carbon element content is less than 5%, such as pristine graphene that is essentially all-carbon.

Thus, the present invention also provides a process of producing multiple porous graphene particulates without using a blowing agent. In some embodiments, this process comprises: (A) preparing a graphene dispersion having multiple primary particles of an anode active material and multiple sheets of a graphene material dispersed in a liquid medium, wherein the graphene material is selected from graphene oxide, reduced graphene oxide, graphene fluoride, graphene chloride, graphene bromide, graphene iodide, hydrogenated graphene, nitrogenated graphene, chemically functionalized graphene, or a combination thereof and wherein the graphene contains a non-carbon element proportion of from 20% to 55% by weight of the graphene material; (B) dispensing, forming and drying the graphene dispersion into multiple droplets containing therein graphene sheets and particles of the anode active material; and (C) heat treating the droplets at a heat treatment temperature selected from 80° C. to 3,200° C. (typically <2,500° C., more typically <2,100° C., and further more typically <1,500° C.) at a desired heating rate sufficient to induce volatile gas molecules from the non-carbon elements for producing the multiple porous graphene particulates. There is no blowing agent in the dispersion.

In one embodiment, the porous graphene particulate, minus the anode active material, has a specific surface area from 200 to 2,000 $m^2/g$. In one embodiment, the porous graphene particulate has a density from 0.1 to 1.5 $g/cm^3$.

In an embodiment, the graphene dispersion has at least 3% by weight of graphene oxide dispersed in the liquid medium to form a liquid crystal phase. In another embodiment, the graphene dispersion contains a graphene oxide dispersion prepared by immersing a graphitic material in a powder or fibrous form in an oxidizing liquid in a reaction vessel at a reaction temperature for a length of time sufficient to obtain the graphene dispersion wherein the graphitic material is selected from natural graphite, artificial graphite, mesophase carbon, mesophase pitch, mesocarbon microbead, soft carbon, hard carbon, coke, carbon fiber, carbon nanofiber, carbon nanotube, or a combination thereof and wherein the graphene oxide has an oxygen content no less than 5% by weight.

In an embodiment, the heat treatment temperature contains a temperature in the range from 80° C.-300° C. and, as a result, the porous graphene particulate has an oxygen content or non-carbon element content less than 5%, and the pore walls have an inter-graphene spacing less than 0.40 nm.

In a preferred embodiment, the heat treatment temperature contains a temperature in the range from 300° C.-1,500° C. and, as a result, the porous graphene particulate has an oxygen content or non-carbon content less than 1%, and the pore walls have an inter-graphene spacing less than 0.35 nm.

When the heat treatment temperature contains a temperature in the range from 1,500° C.-2,100° C., the porous graphene particulate has an oxygen content or non-carbon content less than 0.01% and pore walls have an inter-graphene spacing less than 0.34 nm.

When the heat treatment temperature contains a temperature greater than 2,100° C., the porous graphene particulate has an oxygen content or non-carbon content no greater than 0.001% and pore walls have an inter-graphene spacing less than 0.336 nm, and a mosaic spread value no greater than 0.7.

If the heat treatment temperature contains a temperature no less than 2,500° C., the porous graphene particulate has pore walls containing stacked graphene planes having an inter-graphene spacing less than 0.336 nm, and a mosaic spread value no greater than 0.4.

In one embodiment, the pore walls contain stacked graphene planes having an inter-graphene spacing less than 0.337 nm and a mosaic spread value less than 1.0. In another embodiment, the solid wall portion of the porous graphene particulate exhibits a degree of graphitization no less than 80% and/or a mosaic spread value less than 0.4. In yet another embodiment, the solid wall portion of the porous graphene particulate exhibits a degree of graphitization no less than 90% and/or a mosaic spread value no greater than 0.4.

Typically, the pore walls in a porous graphene particulate contain a 3D network of interconnected graphene planes that are electron-conducting pathways. The cell walls contain graphitic domains or graphite crystals having a lateral dimension ($L_a$, length or width) no less than 20 nm, more typically and preferably no less than 40 nm, still more typically and preferably no less than 100 nm, still more typically and preferably no less than 500 nm, often greater than 1 μm, and sometimes greater than 10 μm. The graphitic domains typically have a thickness from 1 nm to 200 nm, more typically from 1 nm to 100 nm, further more typically from 1 nm to 40 nm, and most typically from 1 nm to 30 nm. In certain embodiments, the pore walls comprise carbon-bonded graphene sheets.

DESCRIPTION OF THE PREFERRED EMBODIMENTS

This invention is directed at the anode (negative electrode layer) containing a high-capacity anode active material for the lithium secondary battery, which is preferably a secondary battery based on a non-aqueous electrolyte, a polymer gel electrolyte, an ionic liquid electrolyte, a quasi-solid electrolyte, or a solid-state electrolyte. The shape of a lithium secondary battery can be cylindrical, square, button-like, etc. The present invention is not limited to any battery shape or configuration. For convenience, we will use Si, $Co_3O_4$, Sn, or $SnO_2$ as illustrative examples of a high-capacity anode active material. This should not be construed as limiting the scope of the invention.

Figure 1:
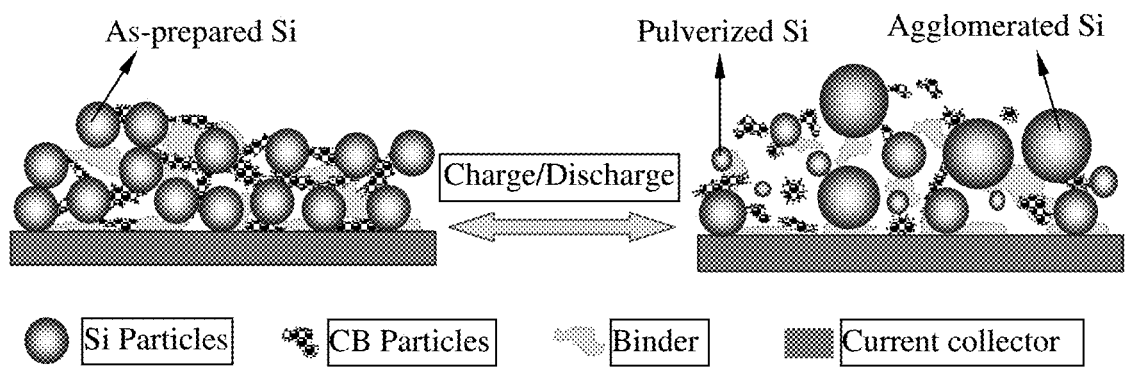
FIG. 1 Schematic illustrating the notion that expansion of Si particles, upon lithium intercalation, can lead to pulverization of Si particles, interruption of the conductive paths formed by the conductive additive, and loss of contact with the current collector.
Figure 2:
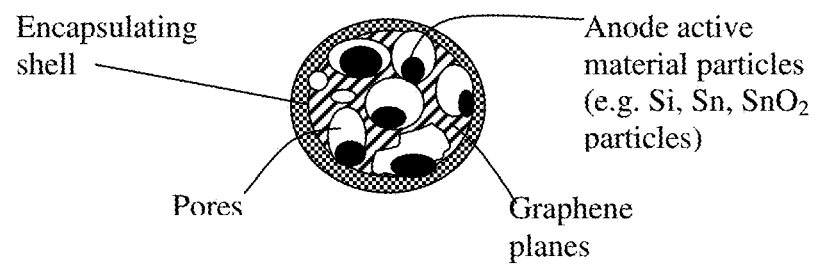
FIG. 2 Schematic of a porous graphene particulate-protected anode active material according to an embodiment of instant invention. Multiple particulates are then bonded together by a resin binder to make an anode electrode.
Figure 3A:
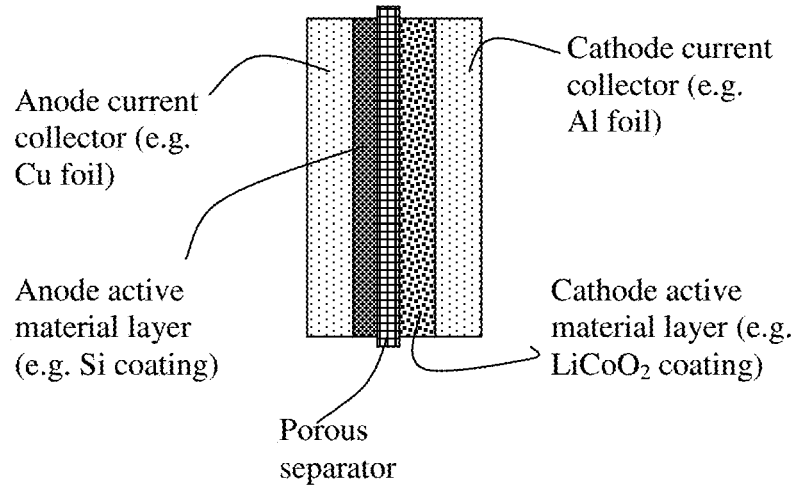
FIG. 3(A) Schematic of a prior art lithium-ion battery cell, wherein the anode layer is a thin coating of an anode active material itself.
Figure 3B:
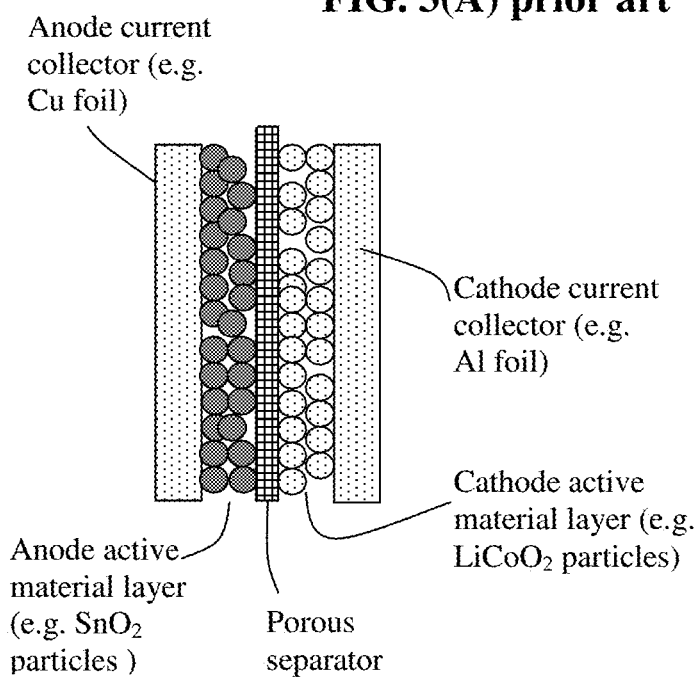
FIG. 3(B) Schematic of another lithium-ion battery; the anode layer being composed of particles of an anode active material, a conductive additive (not shown) and a resin binder (not shown).

As illustrated in FIG. 3(A) and FIG. 3(B), a lithium-ion battery cell is typically composed of an anode current collector (e.g. Cu foil), an anode or negative electrode (anode layer containing an anode active material, conductive additive, and binder), a porous separator and/or an electrolyte component, a cathode electrode (cathode active material, conductive additive, and resin binder), and a cathode current collector (e.g. Al foil). In a more commonly used cell configuration (FIG. 3(B)), the anode layer is composed of primary particles of an anode active material (e.g. graphite, Sn, $SnO_2$, or Si particles), a conductive additive (e.g. carbon black particles), and a resin binder (e.g. SBR or PVDF). This anode layer is typically 50-300 μm thick (more typically 100-200 μm) to give rise to a sufficient amount of current per unit electrode area.

In a less commonly used cell configuration, as illustrated in FIG. 3(A), the anode active material is deposited in a thin film form directly onto an anode current collector, such as a sheet of copper foil. However, such a thin film structure with an extremely small thickness-direction dimension (typically much smaller than 500 nm, often necessarily thinner than 100 nm) implies that only a small amount of active material can be incorporated in an electrode (given the same electrode or current collector surface area), providing a low total lithium storage capacity and low lithium storage capacity per unit electrode surface area. Such a thin film must have a thickness less than 100 nm to be more resistant to cycling-induced cracking. Such a constraint further diminishes the total lithium storage capacity and the lithium storage capacity per unit electrode surface area. Such a thin-film battery has very limited scope of application. On the other hand, a Si layer thicker than 100 nm has been found to exhibit poor cracking resistance during battery charge/discharge cycles. It takes but a few cycles to get such a thick film fragmented. A desirable electrode thickness is at least 100 μm. These thin-film electrodes (with a thickness <100 nm) fall short of the required thickness by three (3) orders of magnitude. As a further problem, Si or $SiO_2$ film-based anode layers cannot be too thick either since these materials are not conductive to transport of both electrons and lithium ions. A large layer thickness implies an excessively high internal resistance.

In other words, there are several conflicting factors that must be considered concurrently when it comes to the design and selection of an anode active material in terms of material type, shape, size, porosity, and electrode layer thickness. Thus far, there has been no effective solution offered by any prior art teaching to these often conflicting problems. We have solved these challenging issues that have troubled battery designers and electrochemists alike for more than 30 years by developing the graphene foam-protected anode active material.

The present invention provides an anode or negative electrode for a lithium battery. The anode comprises multiple porous graphene particulates, wherein at least one of the porous graphene particulates comprises multiple pores (having a total volume Vpp), pore walls, and primary particles of an anode active material (having a total volume Va, disposed in the pores), wherein (A) the pore walls contain a graphene material selected from a pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof; (B) the primary particles of anode active material are in an amount from 0.5% to 95% by weight based on the total porous graphene particulate weight; (C) the graphene particulate is embraced or encapsulated by a thin encapsulating layer of electrically conducting material having a thickness from 1 nm to 10 μm, an electric conductivity from $10^{-6}$ S/cm to 20,000 S/cm and a lithium ion conductivity from $10^{-8}$ S/cm to $5 \times 10^{-2}$ S/cm; and (D) the volume ratio Vpp/Va is from 1.3/1.0 to 5.0/1.0 and the pores in the particulate have a sufficient amount of free space to accommodate the volume expansion of the primary particles of anode active material when the lithium battery is charged without inducing a volume expansion of the anode electrode by more than 20% (preferably from 0% to 10%).

The essential material, graphene, in the invented particulate (secondary particle) is briefly discussed as follows: Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

The constituent graphene planes of a graphite crystallite in a natural or artificial graphite particle can be exfoliated and extracted or isolated to obtain individual graphene sheets of carbon atoms provided the inter-planar van der Waals forces can be overcome. An isolated, individual graphene sheet of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nano graphene platelets" (NGPs). Graphene or graphene oxide sheets/platelets (collectively, NGPs) are a class of carbon nanomaterial (a 2-D nanocarbon) that is distinct from the 0-D fullerene, the 1-D CNT, and the 3-D graphite.

Our research group researched the development of graphene materials and related production processes as early as 2002: (1) Bor Z. Jang and W. C. Huang, "Nano-scaled Graphene Plates," U.S. Pat. No. 7,071,258 (Jul. 4, 2006), application submitted on Oct. 21, 2002; (2) Bor Z. Jang, et al. "Process for Producing Nano-scaled Graphene Plates," U.S. patent application Ser. No. 10/858,814 (Jun. 3, 2004) (U.S. Pat. Pub. No. 2005/0271574); and (3) Bor Z. Jang, A. Zhamu, and J. Guo, "Process for Producing Nano-scaled Platelets and Nanocomposites," U.S. patent application Ser. No. 11/509,424 (Aug. 25, 2006) (U.S. Pat. Pub. No. 2008/0048152). Some graphene and graphene foam production processes are discussed in Ref. (4): Aruna Zhamu and Bor Z. Jang, "Graphene Foam-Protected Anode Active Materials for Lithium Batteries," U.S. patent application Ser. No. 14/121,151 (Aug. 7, 2014) (U.S. Pat. Pub. No. 2016/0043384).

The solid graphene foam typically has a density from 0.1 to 1.5 g/cm$^3$, (more typically from 0.2 to 1.3 g/cm$^3$, and more desirably from 0.3 to 1.2 g/cm$^3$) and a specific surface area from 50 to 2,000 m$^2$/g. When these porous graphene structures are made into centimeter-sized discs for conductivity measurement purposes (instead of into micron-scaled particulates) under comparable heat treatment conditions, they exhibit a thermal conductivity of at least 100 W/mK per unit of specific gravity, and/or an electrical conductivity no less than 1,000 S/cm per unit of specific gravity. It may be noted that these ranges of physical densities are not arbitrarily selected ranges. On the one hand, these densities are designed so that the internal pore amount (level of porosity) is sufficiently large to accommodate the maximum expansion of an anode active material, which varies from one anode active material to another (e.g. approximately 300%-380% maximum volume expansion for Si and approximately 200% for SnO$_2$). On the other hand, the pore amount cannot be too large (or physical density being too low); otherwise, the pore walls of the graphene particulate cannot be sufficiently elastic (or, not capable of undergoing a large deformation that is fully recoverable or reversible).

The anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li; and (h) combinations thereof. Particles of Li or Li alloy, particularly surface-stabilized Li particles (e.g. wax-coated Li particles), were found to be good anode active material per se or an extra lithium source to compensate for the loss of Li ions that are otherwise supplied only from the cathode active material. The presence of these Li or Li-alloy particles was found to significantly improve the cycling performance of a lithium-ion cell.

The anode active material may include particles of natural graphite or artificial graphite, prelithiated or non-lithiated. The particles of the anode active material may be in the form of a nanoparticle, nanowire, nanofiber, nanotube, nanosheet, nanobelt, nanoribbon, or nanocoating. Preferably, the nanoparticle, nanowire, nanofiber, nanotube, nanosheet, nanobelt, nanoribbon, or nanocoating is prelithiated. Preferably, the particles are embraced by an electron-conducting and/or lithium-conducting coating, such as an amorphous carbon produced by chemical vapor deposition (CVD) or pyrolization of a resin.

In some embodiments, the porous graphene particulate further comprises a carbon or graphitic material therein, wherein the carbon or graphite material is in electronic contact with or deposited onto the anode active material particle surface. Most preferably, this carbon or graphite material embraces the particles of the anode active material and the embraced particles are then lodged in the pores of the porous graphene particulate. The carbon or graphite material may be selected from polymeric carbon, amorphous carbon, chemical vapor deposition carbon (CVD carbon), coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof.

In certain embodiments, individual primary particles of the anode active material are coated with a conductive protective coating, selected from a carbon material, electronically conductive polymer, conductive metal oxide, conductive metal coating, or a lithium-conducting material.

Briefly, the process for producing the invented powder mass of porous graphene particulates comprises the following steps:

A) preparing a graphene dispersion having particles of an anode active material and sheets or molecules of a graphene material dispersed in a liquid medium, wherein the graphene material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof and wherein the dispersion contains an optional blowing agent with a blowing agent-to-graphene material weight ratio from 0.01/1.0 to 1.0/1.0 (this blowing agent is normally required if the graphene material is pristine graphene, typically having a blowing agent-to-pristine graphene weight ratio from 0.01/1.0 to 1.0/1.0);

B) dispensing, forming and drying said graphene dispersion into multiple droplets containing therein graphene sheets, particles of the anode active material, and the blowing agent; and C) heat treating the droplets at a heat treatment temperature selected from 80° C. to 3,200° C. (typically <2,500° C., more typically <2,100° C., and further more typically <1,500° C.) at a desired heating rate sufficient to induce volatile gas molecules from the non-carbon elements or to activate the blowing agent for producing the multiple porous graphene particulates.

A polymer may be added into the dispersion in step (A). In this case, the multiple droplets in step (B) also contain polymer therein. When heated, the polymer is converted to carbon and pores.

The process may further include a step of combining these multiple porous graphene particulates, along with a resin binder and an optional conductive additive, into an anode electrode, preferably on an anode current collector (e.g. Cu foil).

The pores in the porous graphene particulate are formed slightly before, during, or after sheets of a graphene material are (1) chemically linked/merged together (edge-to-edge and/or face-to-face) typically at a temperature from 100 to 1,500° C. and/or (2) re-organized into larger graphite crystals or domains (herein referred to as re-graphitization) along the pore walls at a high temperature (typically >2,100° C. and more typically >2,500° C.). It may be noted that the particles of the anode active material may be in the form of small particulate, wire, rod, sheet, platelet, ribbon, tube, etc. with a size of <20 µm (preferably <10 µm, more preferably <5 µm, further preferably <1 µm, still more preferably <300 nm, and most preferably <100 nm). These particles are naturally embraced by graphene sheets, typically leaving behind some gap between the particle and the embracing graphene sheets. Hence, where primary particles of anode active material are present, there are pores in the porous graphene particulate. However, there are additional pores that are formed due to the evolution of volatile gases (from a blowing agent and/or non-carbon elements, such as —OH, —F, etc.) during the heat treatment of graphene. These pores play the role of cushioning the local volume expansion of anode particles, thereby avoiding global expansion of the resulting anode layer. The ability of the pore walls to snap back according to the shrinkage extent of the anode particles comes from the surrounding graphene sheets that are bonded and joint to form larger and stronger graphene planes during heat treatments.

A blowing agent or foaming agent is a substance which is capable of producing a cellular or foamed structure via a foaming or pore-forming process in a variety of materials that undergo hardening or phase transition, such as polymers (plastics and rubbers), glass, and metals. They are typically applied when the material being foamed is in a liquid state. It has not been previously known that a blowing agent can be used to create a foamed material while in a solid state. More significantly, it has not been taught or hinted that an aggregate of sheets of a graphene material in a secondary particle (particulate) form can be converted into a porous graphene particulate via a blowing agent. The cellular structure in a matrix is typically created for the purpose of reducing density, increasing thermal resistance and acoustic insulation, while increasing the thickness and relative stiffness of the original polymer.

Blowing agents or related pore-forming mechanisms to create pores or cells (bubbles) in a structure for producing a porous or cellular material, can be classified into the following groups:

(a) Physical blowing agents: e.g. hydrocarbons (e.g. pentane, isopentane, cyclopentane), chlorofluorocarbons (CFCs), hydrochlorofluorocarbons (HCFCs), and liquid $CO_2$. The bubble/foam-producing process is endothermic, i.e. it needs heat (e.g. from a melt process or the chemical exotherm due to cross-linking), to volatize a liquid blowing agent.

(b) Chemical blowing agents: e.g. isocyanate, azo-, hydrazine and other nitrogen-based materials (for thermoplastic and elastomeric foams), sodium bicarbonate (e.g. baking soda, used in thermoplastic foams). Here gaseous products and other by-products are formed by a chemical reaction, promoted by process or a reacting polymer's exothermic heat. Since the blowing reaction involves forming low molecular weight compounds that act as the blowing gas, additional exothermic heat is also released. Powdered titanium hydride is used as a foaming agent in the production of metal foams, as it decomposes to form titanium and hydrogen gas at elevated temperatures. Zirconium (II) hydride is used for the same purpose. Once formed the low molecular weight compounds will never revert to the original blowing agent(s), i.e. the reaction is irreversible.

(c) Mixed physical/chemical blowing agents: e.g. used to produce flexible polyurethane (PU) foams with very low densities. Both the chemical and physical blowing can be used in tandem to balance each other out with respect to thermal energy released/absorbed; hence, minimizing temperature rise. For instance, isocyanate and water (which react to form $CO_2$) are used in combination with liquid $CO_2$ (which boils to give gaseous form) in the production of very low density flexible PU foams for mattresses.

(d) Mechanically injected agents: Mechanically made foams involve methods of introducing bubbles into liquid polymerizable matrices (e.g. an unvulcanized elastomer in the form of a liquid latex). Methods include whisking-in air or other gases or low boiling volatile liquids in low viscosity lattices, or the injection of a gas into an extruder barrel or a die, or into injection molding barrels or nozzles and allowing the shear/mix action of the screw to disperse the gas uniformly to form very fine bubbles or a solution of gas in the melt. When the melt is molded or extruded and the part is at atmospheric pressure, the gas comes out of solution expanding the polymer melt immediately before solidification.

We have found that the above four mechanisms can all be used to create pores in the graphene materials while they are in a solid state. Another mechanism of producing pores in a graphene material is through the generation and vaporization of volatile gases by removing those non-carbon elements from graphene particulates in a high-temperature environment. This is a unique self-foaming process that has never been previously taught or suggested.

In a preferred embodiment, the graphene material in the dispersion is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The starting graphitic material for producing any one of the above graphene materials may be selected from natural graphite, artificial graphite, mesophase carbon, mesophase pitch, mesocarbon microbead, soft carbon, hard carbon, coke, carbon fiber, carbon nanofiber, carbon nanotube, or a combination thereof.

For instance, the graphene oxide (GO) may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). The resulting graphite oxide particles may then be subjected to thermal exfoliation or ultrasonic wave-induced exfoliation to produce GO sheets.

Pristine graphene may be produced by direct ultrasonication (also known as liquid phase production) or supercritical fluid exfoliation of graphite particles. These processes are well-known in the art. Multiple pristine graphene sheets and primary particles of an anode active material may be dispersed in water or other liquid medium with the assistance of a surfactant to form a suspension. A chemical blowing agent may then be dispersed into the dispersion. This suspension is then spray-dried to form particulates. When heated to a desired temperature, the chemical blowing agent is activated or decomposed to generate volatile gases (e.g. $N_2$ or $CO_2$), which act to form bubbles or pores in an otherwise mass of solid graphene sheets, forming a pristine graphene-based porous particulates having primary particles of anode active material residing therein.

Fluorinated graphene or graphene fluoride is herein used as an example of the halogenated graphene material group. There are two different approaches that have been followed to produce fluorinated graphene: (1) fluorination of presynthesized graphene: This approach entails treating graphene prepared by mechanical exfoliation or by CVD growth with fluorinating agent such as $XeF_2$, or F-based plasmas; (2) exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200° C.-400° C.). Nitrogenated graphene could also be formed at lower temperatures by a hydrothermal method; e.g. by sealing GO and ammonia in an autoclave and then increased the temperature to 150° C.-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The step of forming and drying the multi-component suspension to form droplets and drying the droplets is most preferably conducted using a spray-drying, spray-pyrolysis, fluidized-bed drying procedure, or any procedure that involves an atomization or aerosolizing step.

Step (B) of forming droplets (containing graphene sheets, primary anode particles, and polymer) may be conducted by using a micro-encapsulation process. There are three broad categories of micro-encapsulation methods that can be implemented to produce encapsulated particulates: physical methods, physico-chemical methods, and chemical methods. The physical methods include pan-coating, air-suspension coating, centrifugal extrusion, vibration nozzle, and spray-drying methods. The physico-chemical methods include ionotropic gelation and coacervation-phase separation methods. The chemical methods include interfacial polycondensation, interfacial cross-linking, in-situ polymerization, and matrix polymerization.

Pan-coating method: The pan coating process involves tumbling the active material particles, graphene sheets, and a blowing agent in a pan or a similar device while the encapsulating material (e.g. monomer/oligomer, polymer melt, polymer/solvent solution) is applied slowly until a desired encapsulating shell thickness is attained.

Air-suspension coating method: In the air suspension coating process, the solid particles (core materials, including anode active material particles, graphene sheets, a blowing agent) are dispersed into the supporting air stream in an encapsulating chamber. A controlled stream of a polymer-solvent solution (polymer or its monomer or oligomer dissolved in a solvent; or its monomer or oligomer alone in a liquid state) is concurrently introduced into this chamber, allowing the solution to hit and coat the suspended particles. These suspended particles are encapsulated (fully coated) with polymers while the volatile solvent is removed, leaving a very thin layer of polymer (e.g. elastomer or its precursor, which is cured/hardened subsequently) on surfaces of these particles. This process may be repeated several times until the required parameters, such as full-coating thickness (i.e. encapsulating shell or wall thickness), are achieved. The air stream which supports the particles also helps to dry them, and the rate of drying is directly proportional to the temperature of the air stream, which can be adjusted for optimized shell thickness.

In a preferred mode, the particles in the encapsulating zone portion may be subjected to re-circulation for repeated coating. Preferably, the encapsulating chamber is arranged such that the particles pass upwards through the encapsulating zone, then are dispersed into slower moving air and sink back to the base of the encapsulating chamber, enabling repeated passes of the particles through the encapsulating zone until the desired encapsulating shell thickness is achieved.

Centrifugal extrusion: Anode active materials may be encapsulated using a rotating extrusion head containing concentric nozzles. In this process, a stream of core fluid (slurry containing particles of an anode active material and other ingredients dispersed in a solvent) is surrounded by a sheath of shell solution or melt. The suspension/slurry also contains a blowing agent and graphene sheets. As the device rotates and the stream moves through the air it breaks, due to Rayleigh instability, into droplets of core, each coated with the shell solution. While the droplets are in flight, the molten shell may be hardened or the solvent may be evaporated from the shell solution. If needed, the capsules can be hardened after formation by catching them in a hardening bath. Since the drops are formed by the breakup of a liquid stream, the process is only suitable for liquid or slurry. A high production rate can be achieved. Up to 22.5 kg of microcapsules can be produced per nozzle per hour and extrusion heads containing 16 nozzles are readily available.

Vibrational nozzle encapsulation method: Core-shell encapsulation or matrix-encapsulation of an anode active material (along with a blowing agent, for instance) can be conducted using a laminar flow through a nozzle and vibration of the nozzle or the liquid. The vibration has to be done in resonance with the Rayleigh instability, leading to very uniform droplets. The liquid can consist of any liquids with limited viscosities (1-50,000 mPa·s): emulsions, suspensions or slurry containing the anode active material and graphene sheets. The solidification can be done according to the used gelation system with an internal gelation (e.g. sol-gel processing, melt) or an external (additional binder system, e.g. in a slurry).

Spray-drying: Spray drying may be used to encapsulate particles of an active material when the active material is dissolved or suspended in a melt or polymer solution to form a suspension. The suspension may also contain a sacrificial material and an optional conducting material. In spray drying, the liquid feed (solution or suspension) is atomized to form droplets which, upon contacts with hot gas, allow solvent to get vaporized and thin polymer shell to fully embrace the solid particles of the active material.

Coacervation-phase separation: This process consists of three steps carried out under continuous agitation:
  (a) Formation of three immiscible chemical phases: liquid manufacturing vehicle phase, core material phase and encapsulation material phase. The core material is dispersed in a solution of the encapsulating polymer (elastomer or its monomer or oligomer). The encapsulating material phase, which is an immiscible polymer in liquid state, is formed by (i) changing temperature in polymer solution, (ii) addition of salt, (iii) addition of non-solvent, or (iv) addition of an incompatible polymer in the polymer solution.
  (b) Deposition of encapsulation shell material: core material being dispersed in the encapsulating polymer solution, encapsulating polymer material coated around core particles, and deposition of liquid polymer embracing around core particles by polymer adsorbed at the interface formed between core material and vehicle phase; and
  (c) Hardening of encapsulating shell material: shell material being immiscible in vehicle phase and made rigid via thermal, cross-linking, or dissolution techniques.

Interfacial polycondensation and interfacial cross-linking: Interfacial polycondensation entails introducing the two reactants to meet at the interface where they react with each other. This is based on the concept of the Schotten-Baumann reaction between an acid chloride and a compound containing an active hydrogen atom (such as an amine or alcohol), polyester, polyurea, polyurethane, or urea-urethane condensation. Under proper conditions, thin flexible encapsulating shell (wall) forms rapidly at the interface. A solution of the anode active material and a diacid chloride are emulsified in water and an aqueous solution containing an amine and a polyfunctional isocyanate is added. A base may be added to neutralize the acid formed during the reaction. Condensed polymer shells form instantaneously at the interface of the emulsion droplets. Interfacial cross-linking is derived from interfacial polycondensation, wherein cross-linking occurs between growing polymer chains and a multi-functional chemical groups to form an elastomer shell material.

In-situ polymerization: In some micro-encapsulation processes, active materials particles are fully coated with a monomer or oligomer first. Then, direct polymerization of the monomer or oligomer is carried out on the surfaces of these material particles.

Matrix polymerization: This method involves dispersing and embedding a core material in a polymeric matrix during formation of the particles. This can be accomplished via spray-drying, in which the particles are formed by evaporation of the solvent from the matrix material. Another possible route is the notion that the solidification of the matrix is caused by a chemical change.

In order to illustrate how the presently invented process works to produce a graphene particulate-protected anode layer, we herein make use of graphene oxide (GO) and graphene fluoride (GF) as two examples. These should not be construed as limiting the scope of our claims.

In an embodiment, the powder mass of droplets (e.g. containing GF or GO sheets, primary particles of an anode active material, and a blowing agent) is then subjected to a heat treatment to activate the blowing agent and/or the thermally-induced reactions that remove the non-carbon elements (e.g. F, O, etc.) from the graphene sheets to generate volatile gases as by-products. These volatile gases generate pores or bubbles inside the solid graphene droplets, pushing solid graphene sheets into a foam wall structure, forming a porous graphene oxide particulate. The non-carbon elements in the graphene material preferably occupy at least 10% by weight of the graphene material (preferably at least 20%, and further preferably at least 30%). The first (initial) heat treatment temperature is typically greater than 80° C., preferably greater than 100° C., more preferably greater than 300° C., further more preferably greater than 500° C. and can be as high as 1,500° C. The blowing agent is typically activated at a temperature from 80° C. to 300° C., but can be higher. The foaming procedure (formation of pores, cells, or bubbles) is typically completed within the temperature range of 80° C.-1,500° C. Quite surprisingly, the chemical linking or merging between graphene planes (GO or GF planes) in an edge-to-edge and face-to-face manner can occur at a relatively low heat treatment temperature (e.g. even as low as from 150° C. to 300° C.).

A properly programmed heat treatment procedure can involve just a single heat treatment temperature or a range of heat treatment temperatures (e.g. first temperature for a period of time and then raised to a second temperature and maintained at this second temperature for another period of time), or any other combination of heat treatment temperatures (HTT) that involve an initial treatment temperature (first temperature) and a final HTT (second), higher than the first. The highest or final HTT that the dried graphene layer experiences may be divided into four distinct HTT regimes:

Regime 1 (80° C. to 300° C.): In this temperature range (the thermal reduction regime and also the activation regime for a blowing agent), a GO or GF layer primarily undergoes thermally-induced reduction reactions, leading to a reduction of oxygen content or fluorine content from typically 20-50% (of 0 in GO) or 10-25% (of F in GF) to approximately 5-6%. This treatment results in a reduction of inter-graphene spacing in foam walls from approximately 0.6-1.2 nm (as dried) down to approximately 0.4 nm, and an increase in thermal conductivity to 200 W/mK per unit specific gravity and/or electrical conductivity to 2,000 S/cm per unit of specific gravity. The conductivity measurements were made on samples containing porous graphene discs or slabs prepared under comparable heat treatment conditions as the particulate form factors. (Since one can vary the level of porosity and, hence, specific gravity of a graphene foam material and, given the same graphene material, both the thermal conductivity and electric conductivity values vary with the specific gravity, these property values must be divided by the specific gravity to facilitate a fair comparison.) Even with such a low temperature range, some chemical linking between graphene sheets occurs. The inter-GO or inter-GF planar spacing remains relatively large (0.4 nm or larger). Many O- or F-containing functional groups survive. Most of the commonly used blowing agents get activated in the temperature. This temperature range, however, is typically insufficient to convert a polymer into carbon.

Regime 2 (300° C.-1,500° C.): In this chemical linking regime, extensive chemical combination, polymerization, and cross-linking between adjacent GO or GF sheets occur. The oxygen or fluorine content is reduced to typically <1.0% (e.g. 0.7%) after chemical linking, resulting in a reduction of inter-graphene spacing to approximately 0.345 nm. This implies that some initial re-graphitization has already begun at such a low temperature, in stark contrast to conventional graphitizable materials (such as carbonized polyimide film) that typically require a temperature as high as 2,500° C. to initiate graphitization. This is another distinct feature of the presently invented graphene foam and its production processes. These chemical linking reactions result in an increase in thermal conductivity to 250 W/mK per unit of specific gravity, and/or electrical conductivity to 2,500-4,000 S/cm per unit of specific gravity, as determined by measuring conductivities of corresponding porous graphene discs prepared under comparable heat treatment conditions.

Regime 3 (1,500° C.-2,500° C.): In this ordering and re-graphitization regime, extensive graphitization or graphene plane merging occurs, leading to significantly improved degree of structural ordering in the foam walls. As a result, the oxygen or fluorine content is reduced to typically 0.01% and the inter-graphene spacing to approximately 0.337 nm (achieving degree of graphitization from 1% to approximately 80%, depending upon the actual HTT and length of time). The improved degree of ordering is also reflected by an increase in thermal conductivity to >350 W/mK per unit of specific gravity, and/or electrical conductivity to >3,500 S/cm per unit of specific gravity.

Regime 4 (higher than 2,500° C.): In this re-crystallization and perfection regime, extensive movement and elimination of grain boundaries and other defects occur, resulting in the formation of nearly perfect single crystals or poly-crystalline graphene crystals with huge grains in the foam walls, which can be orders of magnitude larger than the original grain sizes of the starting graphite particles for the production of GO or GF. The oxygen or fluorine content is essentially eliminated, typically 0%-0.001%. The inter-graphene spacing is reduced to down to approximately 0.3354 nm (degree of graphitization from 80% to nearly 100%), corresponding to that of a perfect graphite single crystal. The foamed structure thus obtained exhibits a thermal conductivity of >400 W/mK per unit of specific gravity, and electrical conductivity of >4,000 S/cm per unit of specific gravity. These ultrahigh temperatures are typically not utilized or desired since very few anode active materials can survive such severe environments for an extended period of time (except for lithium niobium oxide, zirconium oxide, etc.)

The presently invented porous graphene particulates containing an anode active material therein can be obtained by heat-treating the dried GO or GF layer with a temperature program that covers at least the first regime (typically requiring 1-4 hours in this temperature range if the temperature never exceeds 500° C.), and more commonly covers the first two regimes (1-2 hours preferred); but less commonly the first three regimes (preferably 0.5-2.0 hours in Regime 3), and seldom cover all the 4 regimes (including Regime 4 for 0.2 to 1 hour, may be implemented to achieve the highest conductivity).

The maximum HET also depends on the type of anode active material embraced by the graphene material. For instance, Sn (melting point=231.9° C.) will not require a temperature higher than 300° C. and cannot tolerate a temperature higher than 500° C. Yet, tin dioxide ($TiO_2$), having a melting point of 1,630° C., can tolerate a temperature up to 2,100° C.

If the graphene material is selected from the group of non-pristine graphene materials consisting of graphene oxide, reduced graphene oxide, graphene fluoride, graphene chloride, graphene bromide, graphene iodide, hydrogenated graphene, nitrogenated graphene, chemically functionalized graphene, or a combination thereof, and wherein the maximum heat treatment temperature (e.g. both the first and second heat treatment temperatures) is (are) less than 2,500° C., then the resulting porous graphene particulates typically contain a content of non-carbon elements in the range from 0.01% to 2.0% by weight (non-pristine graphene foam).

X-ray diffraction patterns were obtained with an X-ray diffractometer equipped with CuKcv radiation. The shift and broadening of diffraction peaks were calibrated using a silicon powder standard. The degree of graphitization, g, was calculated from the X-ray pattern using the Mering's Eq, $d_{002}=0.3354 g+0.344 (1-g)$, where $d_{002}$ is the interlayer spacing of graphite or graphene crystal in nm. This equation is valid only when $d_{002}$ is equal or less than approximately 0.3440 nm. The pore walls of the porous graphene particulate having a $d_{002}$ higher than 0.3440 nm reflects the presence of oxygen- or fluorine-containing functional groups (such as —F, —OH, >O, and —COOH on graphene molecular plane surfaces or edges) that act as a spacer to increase the inter-graphene spacing.

Another structural index that can be used to characterize the degree of ordering of the stacked and bonded graphene planes in the pore walls of graphene and conventional graphite crystals is the "mosaic spread," which is expressed by the full width at half maximum of a rocking curve (X-ray diffraction intensity) of the (002) or (004) reflection. This degree of ordering characterizes the graphite or graphene crystal size (or grain size), amounts of grain boundaries and other defects, and the degree of preferred grain orientation. A nearly perfect single crystal of graphite is characterized by having a mosaic spread value of 0.2-0.4. Most of our graphene walls have a mosaic spread value in this range of 0.2-0.4 (if produced with a heat treatment temperature (HTT) no less than 2,500° C.). However, some values are in the range from 0.4-0.7 if the HTT is between 1,500° C. and 2,500° C., and in the range from 0.7-1.0 if the HTT is between 300° C. and 1,500° C.

Figure 4:
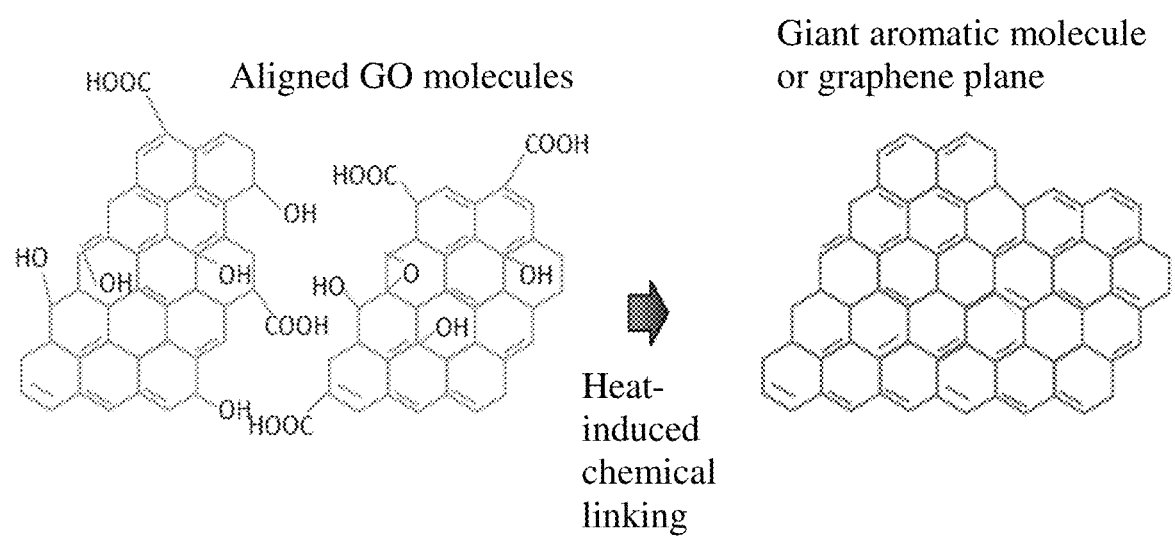
FIG. 4 A possible mechanism of chemical linking between graphene oxide sheets, which mechanism effectively increases the graphene sheet lateral dimensions.

Illustrated in FIG. 4 is a plausible chemical linking mechanism where only 2 aligned GO molecules are shown as an example, although a large number of GO molecules can be chemically linked together to form a pore wall. Further, chemical linking could also occur face-to-face, not just edge-to-edge for GO, GF, and chemically functionalized graphene sheets. These linking and merging reactions proceed in such a manner that the molecules are chemically merged, linked, and integrated into one single entity. The graphene sheets (GO or GF sheets) completely lose their own original identity and they no longer are discrete sheets/platelets/flakes. The resulting product is not a simple aggregate of individual graphene sheets, but a single entity that is essentially a network of interconnected giant molecules with an essentially infinite molecular weight. This may also be described as a graphene poly-crystal (with several grains, but typically no discernible, well-defined grain boundaries). All the constituent graphene planes are very large in lateral dimensions (length and width) and, if the HTT is sufficiently high (e.g. >1,500° C. or much higher), these graphene planes are essentially bonded together with one another. The porous graphene particulates of the presently invented anode layer have the following unique and novel features that have never been previously taught or hinted:

(1) In-depth studies using a combination of SEM, TEM, selected area diffraction, X-ray diffraction, AFM, Raman spectroscopy, and FTIR indicate that the graphene pore walls are composed of several huge graphene planes (with length/width typically >>20 nm, more typically >>100 nm, often >>1 μm). These giant graphene planes are stacked and bonded along the thickness direction (crystallographic c-axis direction) often through not just the van der Waals forces (as in conventional graphite crystallites), but also covalent bonds, if the final heat treatment temperature is lower than 2,500° C. In these cases, wishing not to be limited by theory, but Raman and FTIR spectroscopy studies appear to indicate the co-existence of $sp^2$ (dominating) and $sp^3$ (weak but existing) electronic configurations, not just the conventional $sp^2$ in graphite.

(2) The graphene pore wall is not made by gluing or bonding discrete flakes/platelets together with a resin binder, linker, or adhesive. Instead, GO sheets (molecules) from the GO dispersion or the GF sheets from the GF dispersion are merged through joining or forming of covalent bonds with one another, into an integrated graphene entity, without using any externally added linker or binder molecules or polymers. For a lithium battery featuring such an anode layer, there is no need to have non-active materials, such as a resin binder or a conductive additive, which are incapable of storing lithium. This implies a reduced amount of non-active materials or increased amount of active materials in the anode, effectively increasing the specific capacity per total anode weight, mAh/g (of composite).

(3) The graphene pore walls can comprise graphene sheets bonded by a carbon material converted from a polymer that is present in the droplets prior to heat treating. Graphene sheets and the bonding carbon together form a 3D network of electron-conducting pathways inside a particulate.

(4) The large length and width of the graphene planes enable the pore walls to be of high mechanical strength and elasticity.

(5) Due to these unique chemical composition (including oxygen or fluorine content), morphology, crystal structure (including inter-graphene spacing), and structural features (e.g. high degree of orientations, few defects, incomplete grain boundaries, chemical bonding and no gap between graphene sheets, and substantially no interruptions in graphene planes), the GO- or GF-derived graphene particulates have a unique combination of outstanding thermal conductivity, electrical conductivity, mechanical strength, and stiffness (elastic modulus).

Some of the porous graphene particulates produced by using the presently invented process may contain some small voids or gaps on the exterior surface of the particulate. These gaps or voids may be sealed off by coating or encapsulating the heat-treated porous graphene particulates with a thin layer of conducting polymer, conducting material-reinforced polymer, carbon, or graphene-reinforced carbon (or expanded graphite flake- or CNT-reinforced carbon).

Thus, the process may further comprise a step of coating the porous graphene particulates with a thin encapsulating layer of a polymer (e.g. a conducting polymer) or a polymer composite containing a carbonaceous or graphitic material dispersed in or bonded by a polymer to form polymer- or polymer composite-encapsulated porous graphene particulates. This process may further comprise a step of heat-treating the polymer- or polymer composite-encapsulated porous graphene particulates to obtain carbon- or carbon matrix composite-encapsulated porous graphene particulates.

The invention also provides a process for producing multiple porous graphene particulates for a lithium battery anode without using a blowing agent. The process comprises: (A) preparing a graphene dispersion having multiple primary particles of an anode active material and multiple sheets of a graphene material dispersed in a liquid medium, wherein the graphene material is selected from graphene oxide, reduced graphene oxide, graphene fluoride, graphene chloride, graphene bromide, graphene iodide, hydrogenated graphene, nitrogenated graphene, chemically functionalized graphene, or a combination thereof and wherein the graphene material contains a non-carbon element proportion of from 20% to 55% by weight of the graphene material; (B) dispensing, forming and drying the graphene dispersion into multiple droplets containing therein graphene sheets and particles of the anode active material; and (C) heat treating the droplets at a heat treatment temperature selected from 80° C. to 3,200° C. for a desired heat treatment time to induce volatile gas molecules from the non-carbon elements for producing the multiple porous graphene particulates. The heat treatment temperature may be selected from 100° C. to 1,500° C.

In this process, the dispersion may further comprise a polymer dissolved or dispersed in said liquid medium and the polymer-to-graphene weight ratio is from 1/100 to 100/1.

In certain embodiments, the process further comprises a step of coating the multiple porous graphene particulates (after step C), with a thin encapsulating layer of a polymer or a polymer composite containing a carbonaceous or graphitic material dispersed in or bonded by a polymer to form polymer- or polymer composite-encapsulated porous graphene particulates. The process may further comprise a step of heat-treating said polymer- or polymer composite-encapsulated porous graphene particulates to obtain carbon- or carbon composite-encapsulated porous graphene particulates.

The step of dispensing, forming and drying includes operating a procedure selected from pan-coating, air-suspension coating, centrifugal extrusion, vibration-nozzle encapsulation, spray-drying, coacervation-phase separation, interfacial polycondensation and interfacial cross-linking, in-situ polymerization, matrix polymerization, or a combination thereof.

The following examples are used to illustrate some specific details about the best modes of practicing the instant invention and should not be construed as limiting the scope of the invention. For instance, we only described the procedures use to produce porous graphene particulate-protected Si, Sn, $SnO_2$, and $Co_3O_4$ particles. But, any anode active material that can be made into fine particles (<20 μm in size, preferably <1 μm and further preferably <100 nm) can be similarly incorporated into a graphene suspension (containing graphene sheets, a blowing agent, and an optional polymer) and made into porous graphene particulate-protected anode particles in a similar manner.

Example 1: Various Blowing Agents and Pore-Forming (Bubble-Producing) Processes

In the field of plastic processing, chemical blowing agents are mixed into the plastic pellets in the form of powder or pellets and dissolved at higher temperatures. Above a certain temperature specific for blowing agent dissolution, a gaseous reaction product (usually nitrogen or $CO_2$) is generated, which acts as a blowing agent. However, a chemical blowing agent cannot be dissolved in a graphene material, which is a solid, not liquid. This presents a challenge to make use of a chemical blowing agent to generate pores or cells in a graphene material.

After extensive experimenting, we have discovered that practically any chemical blowing agent (e.g. in a powder or pellet form) can be used to create pores or bubbles in a dried layer of graphene when the first heat treatment temperature is sufficient to activate the blowing reaction. The chemical blowing agent (powder or pellets) may be dispersed in the liquid medium to become a second dispersed phase (sheets of graphene material being the first dispersed phase) in the suspension, which can be deposited onto the solid supporting substrate to form a wet layer. This wet layer of graphene material may then be dried and heat treated to activate the chemical blowing agent. After a chemical blowing agent is activated and bubbles are generated, the resulting foamed graphene structure is largely maintained even when subsequently a higher heat treatment temperature is applied to the structure. This is quite unexpected, indeed.

Chemical foaming agents (CFAs) can be organic or inorganic compounds that release gasses upon thermal decomposition. CFAs are typically used to obtain medium- to high-density foams, and are often used in conjunction with physical blowing agents to obtain low-density foams. CFAs can be categorized as either endothermic or exothermic, which refers to the type of decomposition they undergo. Endothermic types absorb energy and typically release carbon dioxide and moisture upon decomposition, while the exothermic types release energy and usually generate nitrogen when decomposed. The overall gas yield and pressure of gas released by exothermic foaming agents is often higher than that of endothermic types. Endothermic CFAs are generally known to decompose in the range from 130° C. to 230° C. (266° F.-446° F.), while some of the more common exothermic foaming agents decompose around 200° C. (392° F.). However, the decomposition range of most exothermic CFAs can be reduced by addition of certain compounds. The activation (decomposition) temperatures of CFAs fall into the range of our heat treatment temperatures. Examples of suitable chemical blowing agents include sodium bi-carbonate (baking soda), hydrazine, hydrazide, azodicarbonamide (exothermic chemical blowing agents), nitroso compounds (e.g. N, N-dinitroso pentamethylene tetramine), hydrazine derivatives (e.g. 4,4'-oxybis(benzenesulfonyl hydrazide) and hydrazo dicarbonamide), and hydrogen carbonate (e.g. Sodium hydrogen carbonate). These are all commercially available in plastics industry.

In the production of foamed plastics, physical blowing agents are metered into the plastic melt during foam extrusion or injection molded foaming, or supplied to one of the precursor materials during polyurethane foaming. It has not been previously known that a physical blowing agent can be used to create pores in a graphene material, which is in a solid state (not melt). We have surprisingly observed that a physical blowing agent (e.g. $CO_2$ or $N_2$) can be injected into the stream of graphene suspension prior to being formed into droplets. This would result in a porous structure in a particulate form even when the liquid medium (e.g. water and/or alcohol) is removed. The dried porous graphene particulates are capable of maintaining a controlled amount of pores or bubbles during liquid removal and subsequent heat treatments.

Technically feasible blowing agents include carbon dioxide ($CO_2$), nitrogen ($N_2$), isobutane ($C_4H_{10}$), cyclopentane ($C_5H_{10}$), isopentane ($C_5H_{12}$), CFC-11 ($CFCl_3$), HCFC-22 ($CHF_2Cl$), HCFC-142b ($CF_2ClCH_3$), and HCFC-134a ($CH_2FCF_3$). However, in selecting a blowing agent, environmental safety is a major factor to consider. The Montreal Protocol and its influence on consequential agreements pose a great challenge for the producers of foam. Despite the effective properties and easy handling of the formerly applied chlorofluorocarbons, there was a worldwide agreement to ban these because of their ozone depletion potential (ODP). Partially halogenated chlorofluorocarbons are also not environmentally safe and therefore already forbidden in many countries. The alternatives are hydrocarbons, such as isobutane and pentane, and the gases such as $CO_2$ and nitrogen.

Except for those regulated substances, all the blowing agents recited above have been tested in our experiments. For both physical blowing agents and chemical blowing agents, the blowing agent amount introduced into the suspension is defined as a blowing agent-to-graphene material weight ratio, which is typically from 0/1.0 to 1.0/1.0.

Example 2: Preparation of Discrete GO Sheets

Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. The resulting suspension contains GO sheets being suspended in water. A chemical blowing agent (hydrazo dicarbonamide) and selected primary particles (Si, $SnO_2$, etc.) were added to the suspension.

The resulting suspension was then spray-dried to form droplets, which were then subjected to heat treatments that typically involve an initial thermal reduction temperature of 80° C.-350° C. for 1-2 hours, followed by heat-treating at a second temperature of 500° C.-1.50° C. for 0.5 to 5 hours.

Example 3: Preparation of Single-Layer Graphene Sheets from Mesocarbon Microbeads (MCMBs)

Mesocarbon microbeads (MCMBs) were supplied from China Steel Chemical Co., Kaohsiung, Taiwan. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets and primary particles of an anode active material (Si nanowires, Ge, $SnO_2$, etc.) were suspended in water to form suspension (slurry) samples. Sodium hydrogen carbonate (5%-20% by weight), as a chemical blowing agent, was added to the suspension just prior to droplet formation.

Several samples of droplets, with or without a blowing agent, were then subjected to heat treatments that involve an initial (first) thermal reduction temperature of 80° C.-500° C. for 1-5 hours. This first heat treatment generated pores inside the graphene particulates. However, the graphene domains in the pore walls can be further perfected (re-graphitized to become more ordered or having a higher degree of crystallinity and larger lateral dimensions of graphene planes, longer than the original graphene sheet dimensions due to chemical merging) if the particulates (powder form) are heat-treating at a second temperature of 500° C.-2,150° C. for 0.5 hours to 2 hours.

Example 4: Preparation of Pristine Graphene Particulates (Essentially 0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to porous graphene particulates having a higher thermal conductivity. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

Various amounts (1%-30% by weight relative to graphene material) of chemical bowing agents (N, N-dinitroso pentamethylene tetramine or 4,4'-oxybis(benzenesulfonyl hydrazide) and desired amounts of an anode active material were added to a suspension containing pristine graphene sheets and a surfactant in water (containing 0.2% of polyethylene oxide dissolved therein). The suspension was then formed into droplets using a vibration nozzle technique.

The graphene droplets were then subjected to heat treatments that involve a thermal reduction temperature of 80° C.-1,500° C. for 1-5 hours. This heat treatment led to the production of porous graphene particulates.

Comparative Example 4-1: Pristine Graphene Particulate-Protected Anode vs. Prior Art Pristine Graphene Paper/Film-Protected Anode For comparison purpose, a graphene film (paper) containing 61% by weight of Si particles (without any blowing agent) was cast and heat treated up to 1,500° C. to obtain a layer of graphene paper protected anode active material.

Figure 5:
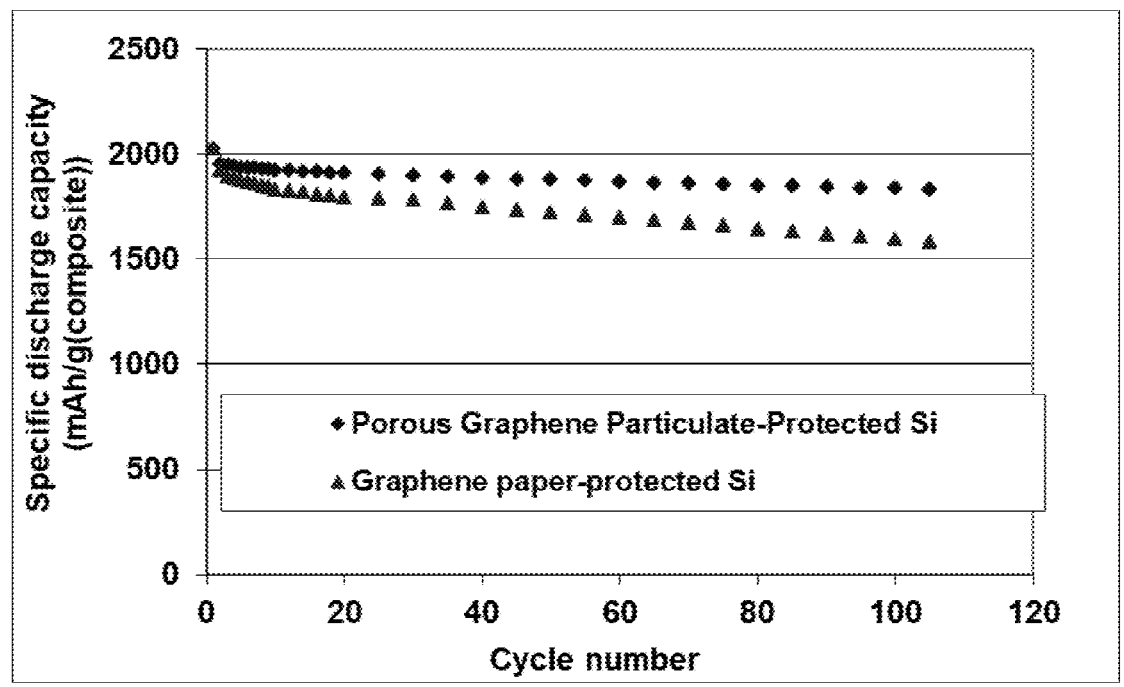
FIG. 5 The specific capacity of a lithium battery having a porous pristine graphene particulate-protected Si and that of a graphene paper-protected Si as an electrode material (lithium metal as the counter-electrode in a half-cell configuration) plotted as a function of the number of charge-discharge cycles.

The anode specific capacity of this anode layer and that of a porous graphene particulate-protected Si-based anode were then evaluated using a lithium metal as the counter-electrode in a half-cell configuration. The specific capacity values of the two cells are plotted as a function of the number of charge-discharge cycles (FIG. 5). Testing battery cells were prepared by following a procedure similar to that in Example 8. These results clearly demonstrate that the presently invented porous graphene particulate strategy provides a lithium battery with more stable cycling stability.

Example 5: Preparation of Graphene Oxide (GO) Suspension from Natural Graphite and Preparation of Subsequent GO-Derived Particulates Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction >3% and typically from 5% to 15%. A chemical blowing agent and anode active material particles were then added into this GO liquid crystal dispersion. The resulting slurry was then formed into droplets using a vibration nozzle procedure. Several GO particulate samples were then subjected to different heat treatments, which typically include a thermal reduction treatment at a first temperature of 100° C. to 500° C. for 1-3 hours, and at a second temperature of 500° C.-2,150° C. for 0.5-5 hours. With these heat treatments, the droplets were turned into porous graphene particulates having anode active material residing in the pores of the particulates.

Figure 6:
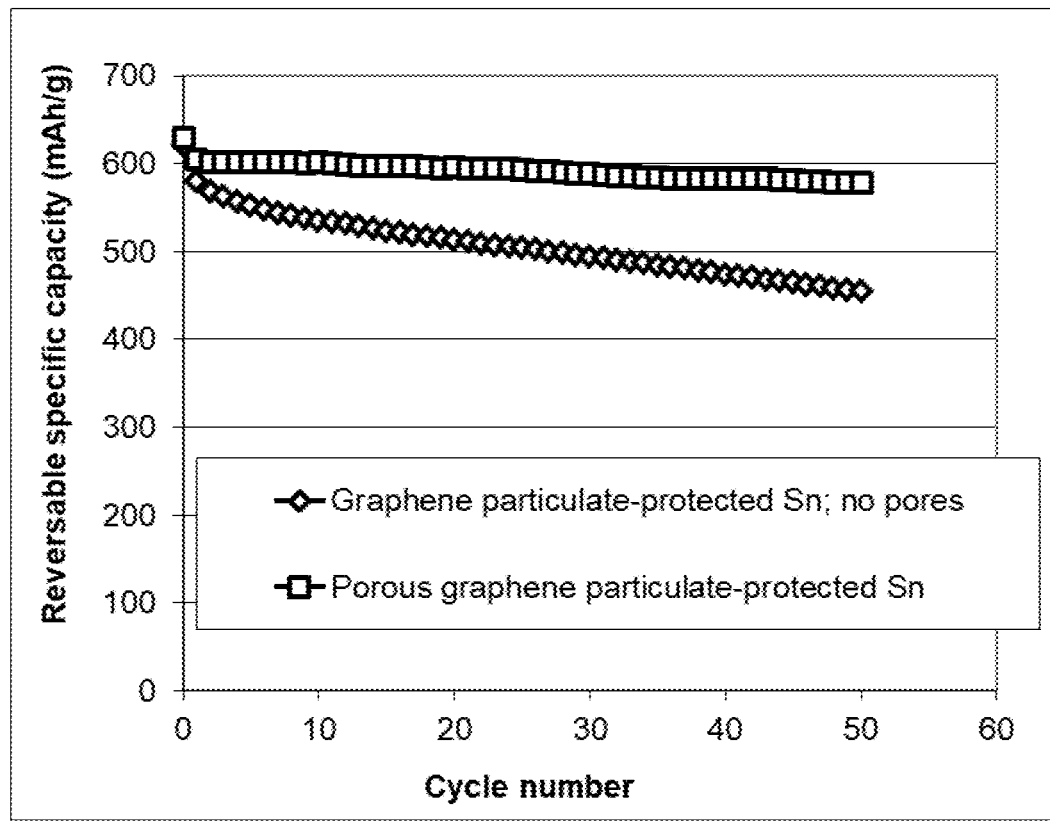
FIG. 6 Specific capacities of two anode layers: the presently invented GO-derived porous graphene particulate-protected Sn and solid, pore-free graphene particulate-protected Sn particles.

Summarized in FIG. 6 are the specific capacities of two anode layers for comparison purposes: an anode featuring the presently invented GO-derived porous graphene particulate-encapsulated Sn and an anode containing graphene-wrapped Sn particles without blowing agent-induced pores. These data have also demonstrated the surprising effectiveness of the invented porous graphene particulate strategy in imparting charge/discharge cycling stability to a lithium-ion battery.

Example 6: Preparation of Porous Graphene Particulates from Graphene Fluoride

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Precooled Teflon reactor was filled with 20-30 mL of liquid precooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but longer sonication times ensured better stability. Particles of an anode active material and a blowing agent were then added to the dispersion to form a slurry, which was then spray-dried to form droplets. When GF droplets were heat-treated, fluorine was released as gases that helped to generate pores in the particulates. When a blowing agent was used (blowing agent/GF weight ratio from 0.5/1 to 0.05/1), a density from 0.02 $g/cm^3$ to 0.35 $g/cm^3$ was obtained. Typical fluorine contents are from 0.001% (HTT=2,500° C.) to 4.7% (HTT=350° C.), depending upon the final heat treatment temperature involved.

Example 7: Preparation of Porous Graphene Particulates from Nitrogenated Graphene Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenated graphene sheets remain dispersible in water. The resulting suspensions, containing added anode active material particles and a blowing agent, were then spray-dried to form droplets, which were heat-treated initially at 200° C.-350° C. as a first heat treatment temperature and subsequently treated at a second temperature of 1,500° C. The resulting nitrogenated graphene foams exhibit physical densities from 0.45 to 1.28 $g/cm^3$. Typical nitrogen contents of the foams are from 0.01% (HTT=1,500° C.) to 5.3% (HTT=350° C.), depending upon the final heat treatment temperature involved.

Example 8: Porous Graphene Particulate-Protected Cobalt Oxide ($Co_3O_4$) Anode

An appropriate amount of inorganic salts $Co(NO_3)_2 \cdot 6H_2O$ and ammonia solution ($NH_3 \cdot H_2O$, 25 wt. %) were mixed together. The resulting suspension was stirred for several hours under an argon flow to ensure a complete reaction. The obtained $Co(OH)_2$ precursor suspension was calcined at 450° C. in air for 2 h to form particles of the layered $Co_3O_4$. Some of the $Co_3O_4$ particles were combined with GO sheets to form porous graphene particulates each comprising a carbon shell-encapsulated core of $Co_3O_4$ particles and blowing agent-induced pores. The shell thickness was varied from 115 nm to 1.2 μm.

For electrochemical testing, the working electrodes were prepared by mixing 85 wt. % active material (porous graphene particulate-protected $Co_3O_4$ and non-porous graphene ball-wrapped $Co_3O_4$, separately), 7 wt. % acetylene black (Super-P), and 8 wt. % polyvinylidene fluoride (PVDF) binder dissolved in N-methyl-2-pyrrolidinoe (NMP) to form a slurry of 5 wt. % total solid content. After coating the slurries on Cu foil, the electrodes were dried at 120° C. in vacuum for 2 h to remove the solvent before pressing. Then, the electrodes were cut into a disk (ϕ=12 mm) and dried at 100° C. for 24 h in vacuum. Electrochemical measurements were carried out using CR2032 (3V) coin-type cells with lithium metal as the counter/reference electrode, Celgard 2400 membrane as separator, and 1 M $LiPF_6$ electrolyte solution dissolved in a mixture of ethylene carbonate (EC) and diethyl carbonate (DEC) (EC-DEC, 1:1 v/v). The cell assembly was performed in an argon-filled glove-box. The CV measurements were carried out using a CH-6 electrochemical workstation at a scanning rate of 1 mV/s.

The electrochemical performance of the particulates of carbon/graphene-encapsulated $Co_3O_4$ particles having pores created by-design and those having no pores were evaluated by galvanostatic charge/discharge cycling at a current density of 50 mA/g, using a LAND electrochemical workstation.

Figure 7:
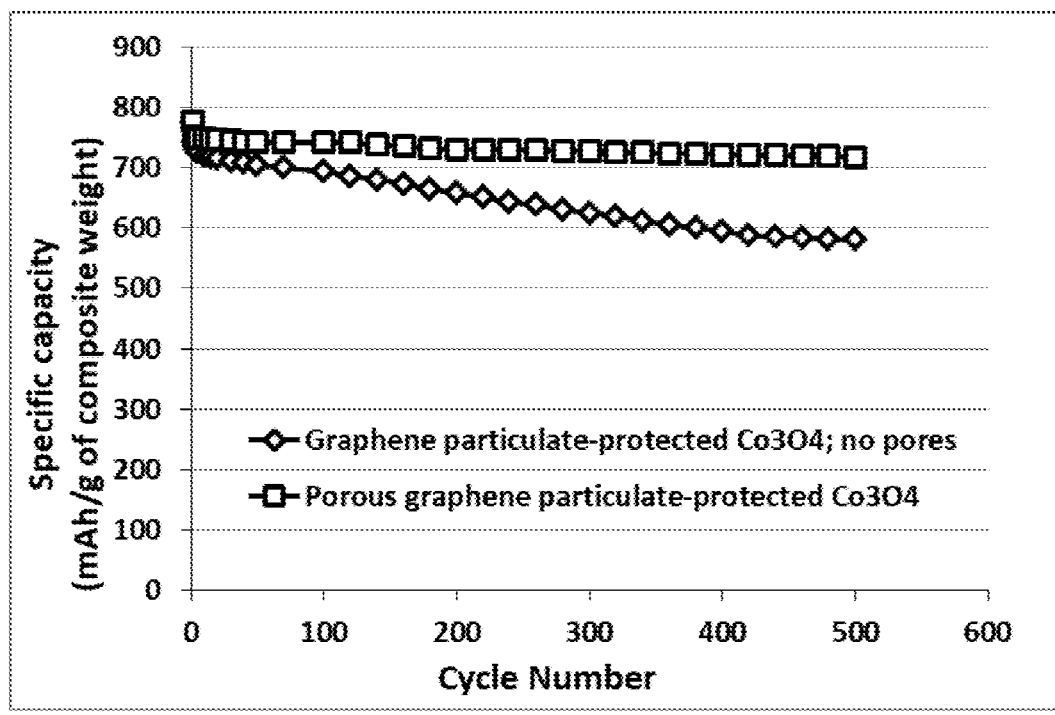
FIG. 7 Specific capacities of two anode layers: the presently invented porous graphene particulate-protected $Co_3O_4$ particles and solid, pore-free graphene particulate-protected $Co_3O_4$ particles.

As summarized in FIG. 7, the first-cycle lithium insertion capacity is 765 mAh/g, which is higher than the theoretical values of graphite (372 mAh/g). Both cells exhibit some first-cycle irreversibility. The initial capacity loss might have resulted from the incomplete conversion reaction and partially irreversible lithium loss due to the formation of solid electrolyte interface (SEI) layers.

As the number of charge/discharge cycles increases, the specific capacity of the pore-free $Co_3O_4$ particulate-based electrode drops at a much higher decay rate. Compared with its initial capacity value of approximately 775 mAh/g, its capacity suffers a 20% loss after 320 cycles (i.e. cycle life=320 cycles). By contrast, the presently invented porous graphene particulate-protected particulates having pores provide the battery cell with a very stable and high specific capacity for a large number of cycles, experiencing a capacity loss of less than 7.5% after 500 cycles. These data have clearly demonstrated the surprising and superior performance of the presently invented porous graphene particulate-protected anode material compared with prior art solid graphene particulate-protected materials.

It may be noted that the number of charge-discharge cycles at which the specific capacity decays to 80% of its initial value is commonly defined as the useful cycle life of a lithium-ion battery. Thus, the cycle life of the cell containing the non-encapsulated anode active material is approximately 150 cycles. In contrast, the cycle life of the presently invented cells (not just button cells, but large-scale full cells) is typically from 1,000 to 4,000.

Example 9: Porous Graphene Particulate-Encapsulated Tin Oxide

Tin oxide ($SnO_2$) nanoparticles were obtained by the controlled hydrolysis of $SnCl_4 \cdot 5H_2O$ with NaOH using the following procedure: $SnCl_4 \cdot 5H_2O$ (0.95 g, 2.7 m-mol) and NaOH (0.212 g, 5.3 m-mol) were dissolved in 50 mL of distilled water each. The NaOH solution was added dropwise under vigorous stirring to the tin chloride solution at a rate of 1 mL/min. This solution was homogenized by sonication for 5 m in. Subsequently, the resulting hydrosol was reacted with $H_2SO_4$. To this mixed solution, few drops of 0.1 M of $H_2SO_4$ were added to flocculate the product. The precipitated solid was collected by centrifugation, washed with water and ethanol, and dried in vacuum. The dried product was heat-treated at 400° C. for 2 h under Ar atmosphere to obtain $SnO_2$ particles.

Figure 8:
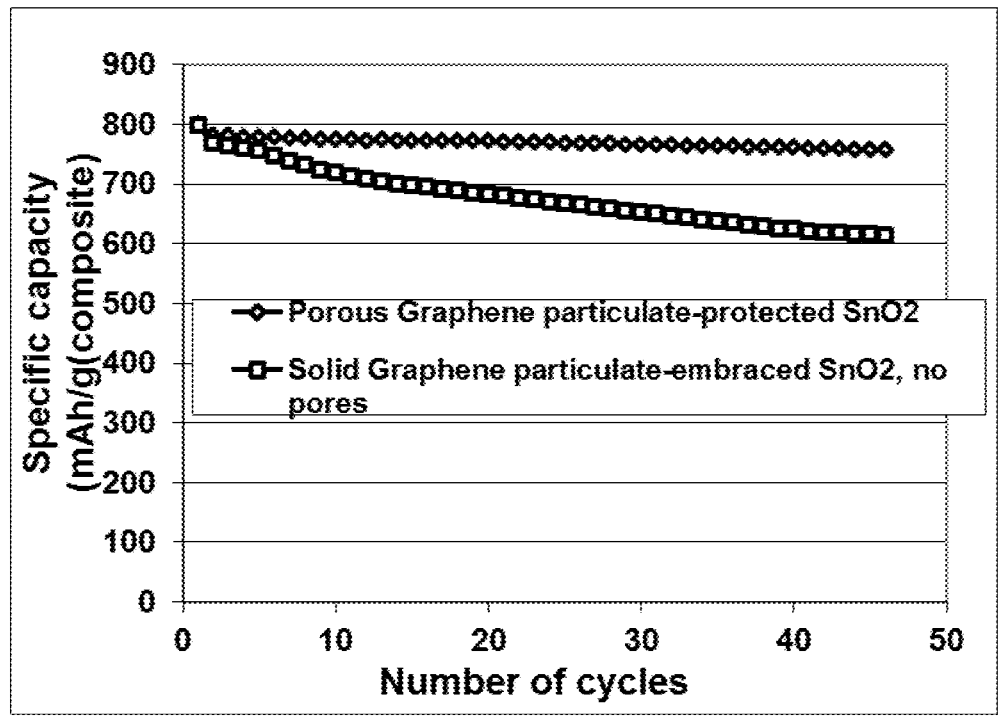
FIG. 8 Specific capacities of two anode layers: the presently invented porous graphene particulate-protected $SnO_2$ particles and solid, pore-free graphene particulate-protected $SnO_2$ particles.

The battery cells from the elastomer-encapsulated $SnO_2$ particles and non-coated $SnO_2$ particles were prepared using a procedure described in Example 1. FIG. 8 shows that the anode prepared according to the presently invented approach of porous graphene particulate protection having a high level of internal porosity offers a significantly more stable and higher reversible capacity compared to the $SnO_2$ particle-based particulates having no internal pores.

Example 10: Porous Graphene Particulate-Protected Si Nanowires

Si nanowires were supplied from Angstron Energy Co. (Dayton, Ohio). In a first series of samples, Si nanowires (approximately 63% by weight based on the final particulate weight), oxidized expanded graphite flakes (5% by weight) and a blowing agent were dispersed into water (containing 0.5% by weight of polyethylene oxide or PEO dissolved therein) to form a slurry. The slurry was then spray-dried to form droplets containing a core of Si nanowires, expanded graphite flakes, and the blowing agent being embraced by an encapsulating shell of expanded graphite flake-PEO composite. Some of the particulates were then subjected to heat treatments that convert the polymer (PEO) into carbon and pores in the core region and carbon-bonded graphite flakes in the encapsulating shell. Surprisingly, the converted carbon along with the expanded graphite flakes in the encapsulating shell on the exterior surface of the particulate somehow form a relatively pore-free skin layer and yet, in contrast, the volume of the droplet is significantly expanded (25% to 88% by volume of pores, depending upon the proportion of the blowing agent used) with some residual carbon that serves as an electron-conducting material for the Si nanowires. The Si nanowires occupy approximately 18% to 33% by volume in these samples. A second series of samples were prepared in a similar manner, but did not contain a blowing agent in the slurry. As such, the resulting particulates after heat treatments do not contain any significant amount of pores (typically <5%).

Figure 9:
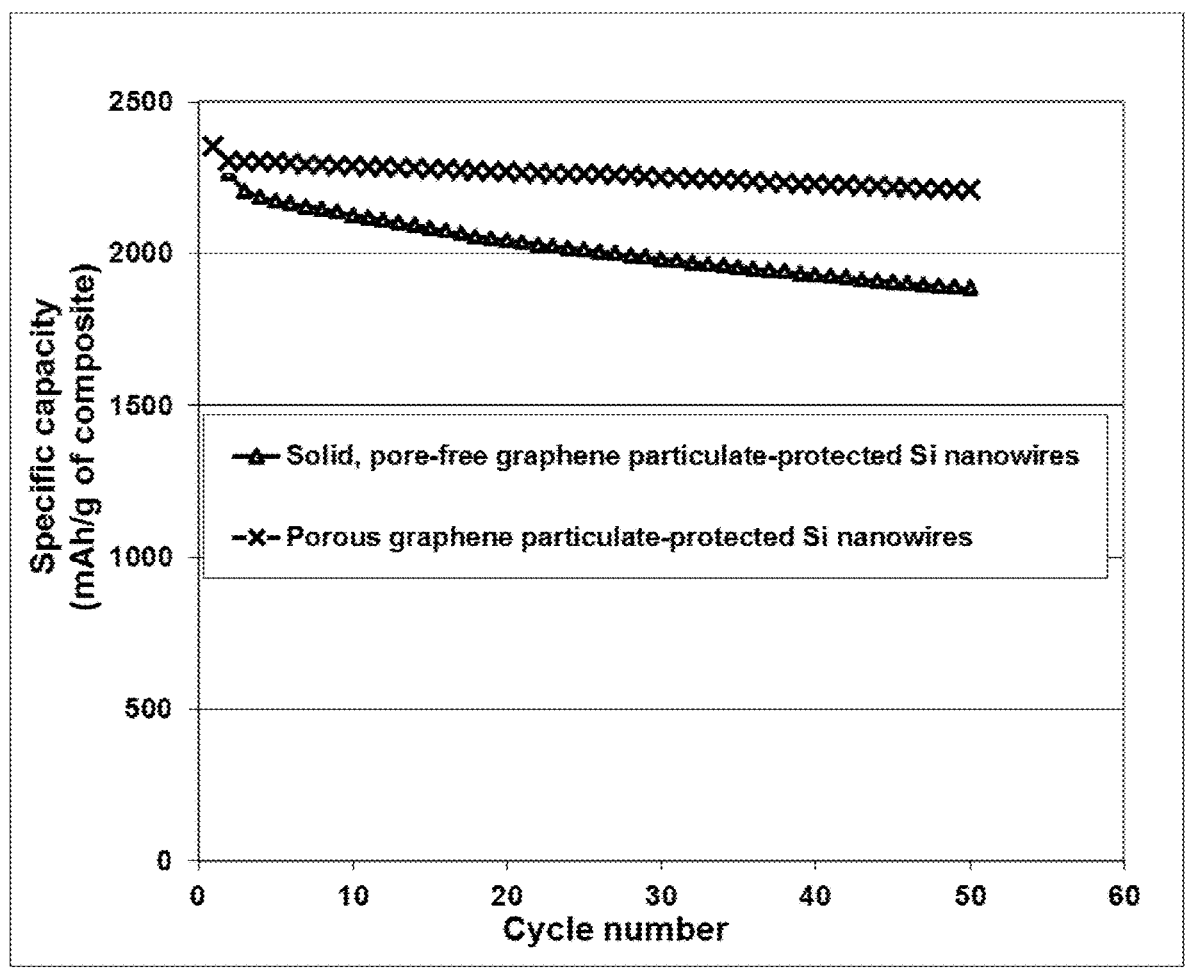
FIG. 9 Specific capacities of two anode layers: the presently invented porous graphene particulate-protected Si nanowires and solid, pore-free graphene particulate-protected Si nanowires.

FIG. 9 shows the specific capacities of 2 lithium-ion cells having a core of Si nanowires (SiNW) and expanded graphite flakes dispersed in a carbon matrix derived from PEO and an encapsulating shell of expanded graphite flakes-carbon: one having pores (76% by volume) derived from carbonized PEO and the blowing agent and the other having no artificially created pores. Clearly, the presently invented strategy of implementing blowing agent-induced pores or free space in the anode particulates is very effective in reducing the rapid capacity decay issues commonly associated with high-capacity anode active materials.

We claim:

1. An anode or negative electrode layer for a lithium battery, said anode layer comprising multiple porous graphene particulates, wherein at least one of said porous graphene particulates comprises multiple pores, having a total volume Vpp, pore walls, and primary particles of an anode active material, having a total volume Va, disposed in said pores, wherein
   a) said pore walls contain a graphene material selected from a pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof;
   b) said primary particles of anode active material are in an amount from 0.5% to 95% by weight based on the total porous graphene particulate weight;
   c) said graphene particulate is embraced or encapsulated by a thin encapsulating layer of electrically conducting material having a thickness from 1 nm to 10 μm, an electric conductivity from $10^{-6}$ S/cm to 20,000 S/cm and a lithium ion conductivity from $10^{-8}$ S/cm to $5 \times 10^{-2}$ S/cm, wherein said thin encapsulating layer comprises a material selected from a nanocarbon particle, metal nanowire, or a combination thereof; and
   d) the volume ratio Vpp/Va is from 1.3/1.0 to 5.0/1.0 and said pores in said particulate have a sufficient amount of free space to accommodate a volume expansion of said primary particles of anode active material when said lithium battery is charged without inducing a volume expansion of said anode electrode by more than 20%.

2. The anode layer of claim 1, wherein said porous graphene particulate, excluding particles of anode active material, has a density from 0.1 to 1.5 g/cm³ and a specific surface area from 50 to 2,000 m²/g.

3. The anode layer of claim 1, wherein said primary particles of anode active material are in a form of nanoparticle, nanowire, nanofiber, nanotube, nanosheet, nanobelt, nanoribbon, or nanocoating having a thickness or diameter less than 100 nm.

4. The anode layer of claim 3, wherein said primary particles of anode active material have a dimension less than 20 nm.

5. The anode layer of claim 1, wherein said porous graphene particulate further comprises a carbon or graphite material therein, wherein said carbon or graphite material is in electronic contact with or deposited onto said primary particles of anode active material.

6. The anode layer of claim 5, wherein said carbon or graphite material is selected from polymeric carbon, amorphous carbon, chemical vapor deposition carbon, coal tar pitch, petroleum pitch, mesophase pitch, carbon black, coke, acetylene black, activated carbon, fine expanded graphite particle with a dimension smaller than 100 nm, artificial graphite particle, natural graphite particle, or a combination thereof.

7. The anode layer of claim 1, wherein said porous graphene particulate further comprises a carbon material that chemically bonds sheets of said graphene together to form an integral 3D network of electron-conducting pathways interposed between pores inside said particulate.

8. The anode layer of claim 1, wherein said pore walls contain stacked graphene planes having an inter-plane spacing $d_{002}$ from 0.3354 nm to 0.36 nm as measured by X-ray diffraction.

9. The anode layer of claim 1, wherein said pore walls contain a pristine graphene and said solid porous graphene particulate has a density from 0.5 to 1.5 g/cm$^3$, excluding said primary particles of anode active material.

10. The anode layer of claim 1, wherein said pore walls contain graphene fluoride and said porous graphene particulate contains a fluorine content from 0.01% to 2.0% by weight.

11. The anode layer of claim 1, wherein said pore walls contain graphene oxide and said porous graphene particulate contains an oxygen content from 0.01% to 2.0% by weight.

12. The anode layer of claim 1, wherein said porous graphene particulate has an oxygen content or non-carbon content less than 1% by weight, and said pore walls have an inter-graphene spacing less than 0.35 nm.

13. The anode layer of claim 1, wherein said porous graphene particulate has an oxygen content or non-carbon content less than 0.01% by weight and said pore walls contain stacked graphene planes having an inter-graphene spacing less than 0.34 nm.

14. The anode layer of claim 1, wherein said porous graphene particulate has an oxygen content or non-carbon content no greater than 0.01% by weight and said pore walls contain stacked graphene planes having an inter-graphene spacing less than 0.336 nm, and a mosaic spread value no greater than 0.7.

15. The anode layer of claim 1, wherein said porous graphene particulate has pore walls containing stacked graphene planes having an inter-graphene spacing less than 0.336 nm and a mosaic spread value no greater than 0.4.

16. The anode layer of claim 1, wherein the pore walls contain stacked graphene planes having an inter-graphene spacing less than 0.337 nm and a mosaic spread value less than 1.0.

17. The anode layer of claim 1, wherein said pore walls contain a 3D network of interconnected graphene planes.

18. A lithium battery containing the anode or negative electrode layer as defined in claim 1, a cathode or positive electrode, and an electrolyte in ionic contact with said anode and said cathode.

19. The lithium battery of claim 18, further containing a cathode current collector in electronic contact with said cathode or further containing an anode current collector in electronic contact with said anode.

20. The lithium battery of claim 18, which is a lithium-ion battery, lithium metal battery, lithium-sulfur battery, or lithium-air battery.

21. A powder mass of an anode active material comprising multiple porous graphene particulates, wherein at least one of said porous graphene particulates comprises multiple pores, having a total volume Vpp, pore walls, and primary particles of said anode active material, having a total volume Va, disposed in said pores, wherein A) said pore walls contain a graphene material selected from a pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof;

B) said primary particles of anode active material are in an amount from 0.5% to 95% by weight based on the total porous graphene particulate weight;

C) said graphene particulate is embraced or encapsulated by a thin encapsulating layer of electrically conducting material having a thickness from 1 nm to 10 μm, an electric conductivity from $10^{-6}$ S/cm to 20,000 S/cm and a lithium ion conductivity from $10^{-8}$ S/cm to $5 \times 10^{-2}$ S/cm, wherein said thin encapsulating layer comprises a material selected from a nanocarbon particle, metal nanowire, or a combination thereof; and D) the volume ratio Vpp/Va is from 1.3/1.0 to 5.0/1.0.

* * * * *